(12) United States Patent  
Watanabe et al.

(10) Patent No.: US 6,600,133 B2  
(45) Date of Patent: Jul. 29, 2003

(54) WELDING SYSTEM

(75) Inventors: Masao Watanabe, Kobe (JP); Hideshi Sakashita, Kobe (JP); Tadashi Nagashima, Kobe (JP); Takashi Ishide, Takasago (JP); Kenji Nishikawa, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 42 days.

(21) Appl. No.: 10/009,442

(22) PCT Filed: Apr. 10, 2001

(86) PCT No.: PCT/JP01/03062

§ 371 (c)(1),  
(2), (4) Date: Dec. 10, 2001

(87) PCT Pub. No.: WO01/76806

PCT Pub. Date: Oct. 18, 2001

(65) Prior Publication Data

US 2002/0158055 A1 Oct. 31, 2002

(30) Foreign Application Priority Data

| Apr. 10, 2000 | (JP) | ................................... | 2000-108492 |
| Apr. 10, 2000 | (JP) | ................................... | 2000-108503 |
| Apr. 10, 2000 | (JP) | ................................... | 2000-108504 |
| Apr. 10, 2000 | (JP) | ................................... | 2000-108505 |
| Mar. 14, 2001 | (JP) | ................................... | 2001-071400 |

(51) Int. Cl.[7] .............................................. B23K 9/00  
(52) U.S. Cl. ................. 219/125.1; 219/75; 219/121.63; 219/158  
(58) Field of Search .................... 219/125.1, 121.63, 219/121.64, 137 R, 158, 74, 75

(56) References Cited

U.S. PATENT DOCUMENTS 6,294,754 B1 * 9/2001 Nagura et al. ......... 219/121.63

FOREIGN PATENT DOCUMENTS

| JP | 60-106688 | 6/1985 |
| JP | 185590/1986 | 11/1986 |
| JP | 1-241392 | 9/1989 |
| JP | 10-137956 | 5/1998 |
| JP | 10-244369 | 9/1998 |
| JP | 2000-24788 | 1/2000 |

* cited by examiner

Primary Examiner—Clifford C. Shaw  
(74) Attorney, Agent, or Firm—Oblon, Spivak, McClelland, Maier & Neustadt, P.C.

(57) ABSTRACT

In a welding system for performing butt welding which comprises butting the end surfaces of steel plates, materials to be welded, placed on the upper surface of a table of a welding stage and welding the end surfaces together, a welding head is a laser/arc combined welding head for simultaneously performing laser light irradiation and arc discharge of the materials 38 to be welded, thereby welding the materials to be welded, and the position of an arc electrode 40 in an up-and-down direction relative to the materials 38 to be welded, the position of the arc electrode in a direction perpendicular to the direction of the optical axis of laser light 32 applied to the materials 38 to be welded, and the inclination angle of the arc electrode relative to the optical axis of the laser light 32 can be adjusted.

12 Claims, 35 Drawing Sheets

FIG. 17
(a)
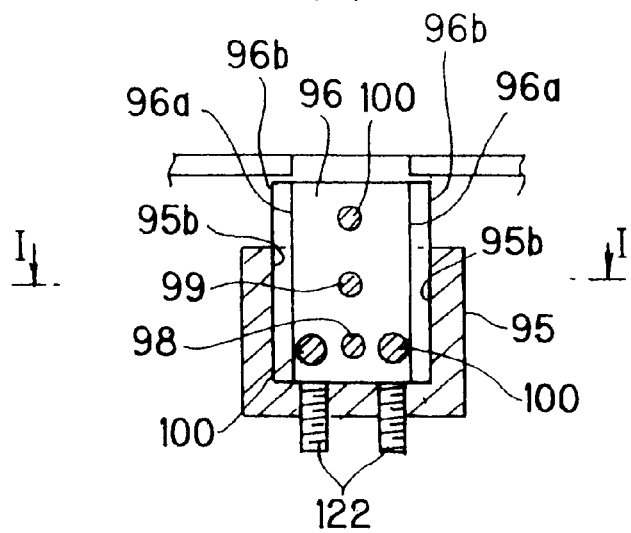
(b)
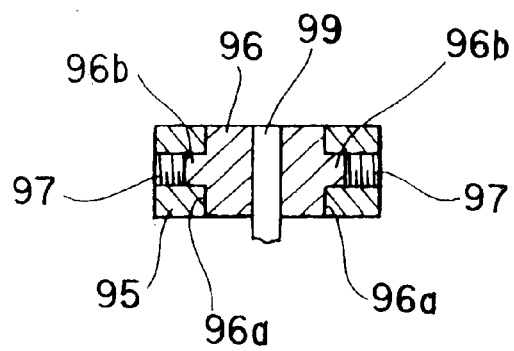

FIG. 18
(a)
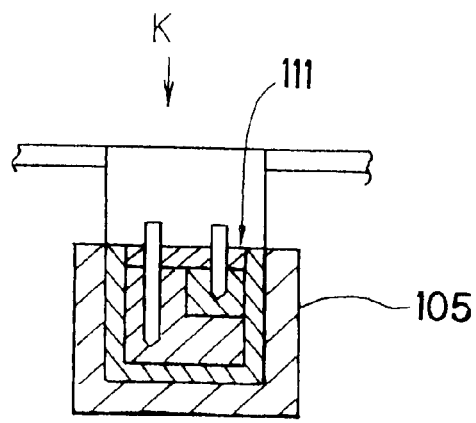
(b)
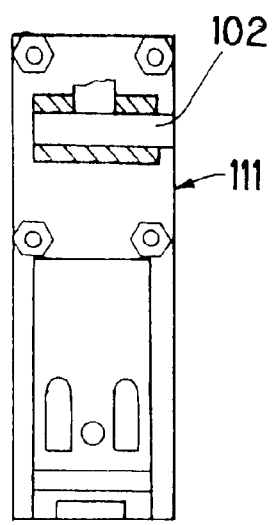

FIG. 28
(a)
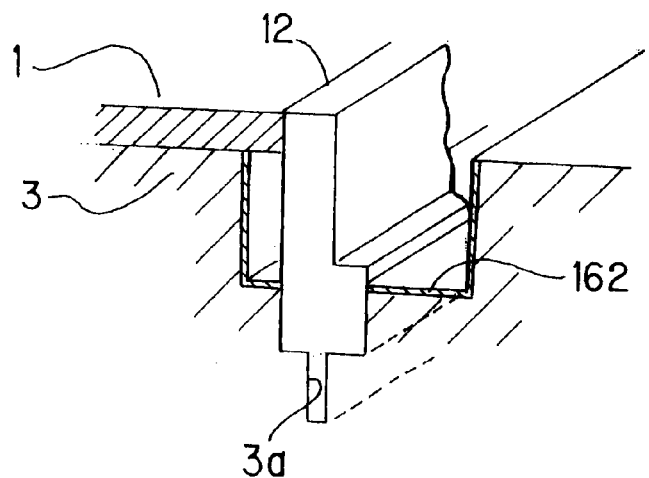
(b)
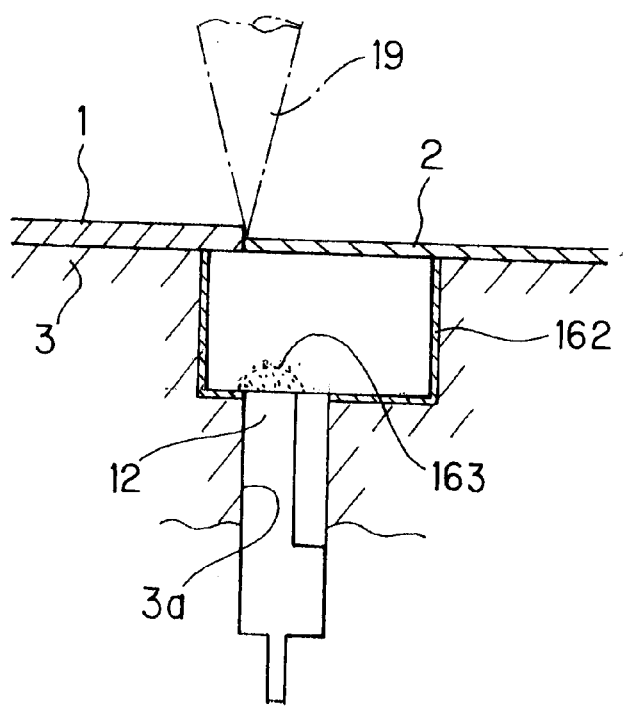

WELDING SYSTEM

TECHNICAL FIELD

This invention relates to a welding system, and more particularly, to one useful when applied in performing high accuracy butt welding.

BACKGROUND ART

In recent years, a material called a tailored blank, which is formed by butting a plurality of steel plates having the same plate thickness and comprising the same material or having different plate thicknesses and comprising different materials, and integrating them by $CO_2$ (carbon dioxide gas) laser welding or the like, has been used as a molding material for a vehicle body panel of an automobile, etc.

When this type of tailored blank is used, tip materials, which have occurred as scrap during various pressing steps, can be used effectively, waste of the material is reduced, and the yield from the material is increased. When a tailored blank comprising a combination of a steel plate having a large plate thickness and a steel plate having a small plate thickness is used to mold a panel part of a predetermined shape, for example, other advantages are also obtained, such that weight reduction can be achieved compared with molding of the entire panel part from a single thick steel plate.

When a tailored blank is to be obtained by butt welding two steel plates, it is necessary to place on a table, which constitutes a horizontal surface, two steel plates to be butt welded, and either transport each steel plate toward a predetermined reference plate, or transport one of the steel plates toward the end surface of the other steel plate whose positioning has been completed upon its butting against the reference plate to butt the two steel plates against each other. Thus, a welding system for performing this type of tailored blank welding needs to have a transport device and a reference position locating mechanism for steel plates as materials to be welded.

When butt welding of materials to be welded is to be carried out, such as when a tailored blank is to be obtained by butt welding two steel plates, it is generally necessary to run a carriage bearing a welding head along a horizontal beam. By so doing, the welding head is moved along a weld line of a butt weld zone. From the viewpoint of the welding efficiency, it is desirable to move the welding head at a high speed. On the other hand, a demand for the accuracy of welding in a tradeoff relationship with the high moving speed is becoming harsh year by year.

In view of the above points, the preferred welding head for use in the welding system is a laser/arc combined welding head for simultaneous implementation of laser welding and arc welding which can perform welding with a large melting width (high groove tolerance) and a great penetration depth.

An example of this type of laser/arc combined welding head is a coaxial welding head proposed in Japanese Unexamined Patent Publication No. 1999-156573. The coaxial welding head (not shown) reflects laser light by a convex surface of a convex roof mirror to divide it into two beams, a first divisional laser beam and a second divisional laser beam, further reflects these divisional laser beams by a concave surface of a concave roof mirror to form a space portion between the first divisional laser beam and the second divisional laser beam, and places an arc electrode in this space portion to make the laser light and the arc electrode coaxial. This coaxial arrangement of the laser light and the arc electrode obtains the effect that the welding head can be downsized, and the effect that the welding head can be moved easily in an arbitrary direction.

However, when laser welding and arc welding are performed simultaneously using the laser/arc combined welding head according to the prior art, a metal vapor 05 generated by irradiation of a material 03 to be welded, such as a steel plate, with laser light 02 deposits on the tip of an arc electrode (arc rod) 01, as shown in FIG. 36.

Thus, the arc electrode 01 minimally discharges, or the deposited metal interferes with the laser light path to decrease the energy of the laser light 02. That is, from the point of view of applying an arc discharge reliably to the material 03 to be welded, the arc electrode 01 should be rendered as close as possible to a laser light irradiation position 03*a* of the material 03 to be welded. From the viewpoint of avoiding deposition of the metal vapor 05 on the tip of the arc electrode, the arc electrode 01 should be made as remote as possible from the laser light irradiation position 03*a*.

Hence, it is desirable to set the arc electrode 01 at an optimal position which satisfies both of the above requirements. However, optimal conditions for placement have not been obtained, because of the lack of an arc electrode adjusting mechanism.

The present invention has been made in view of the above-described prior art. The object of the present invention is to provide a welding system which has a combined welding head capable of performing combined welding under optimal conditions for placement of an arc electrode relative to a laser light irradiation position while effectively preventing deposition of a metal vapor on the arc electrode, and which can perform butt welding, such as tailored blank welding, with high efficiency and high accuracy.

DISCLOSURE OF THE INVENTION

The constitutions of the present invention for attaining the above object are as follows:

I) A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the plate material, prior to butt welding for butting the end surfaces of the materials to be placed on the upper surface of the table and welding the end surfaces together, and which retreats downward from the upper surface of the table during welding;

transport means for materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the welding head is a laser/arc combined welding head for simultaneously performing laser light irradiation and arc discharge of the materials to be welded, thereby welding the materials to be welded, and further includes arc electrode position adjusting means for moving an arc electrode in a direction perpendicular to a direction of an optical axis of laser light applied to the materials to be welded, thereby adjusting the position of the arc electrode in the perpendicular direction relative to the position of irradiation with laser light in the materials to be welded.

According to the present invention, the material to be welded, which has been transported by the transport means, is brought into contact with the reference plate of the reference position locating means, and positioned thereby, and then the end surface of the other material to be welded, which has been transported by other transport means, is brought into contact with the end surface of the positioned material to be welded, to complete preparations for butt welding. In this condition, butt welding can be performed using the laser/arc combined welding head which travels together with the carriage along the weld line running along a butt zone of the two materials to be welded. That is, positioning for butt welding of the materials to be welded, and butt welding can be carried out automatically as a series of operations.

In the butt welding, the arc electrode can be moved in the direction perpendicular to the direction of the optical axis of laser light applied to the materials to be welded. Thus, there can be selected optimal conditions for placement of the arc electrode at the position in the perpendicular position, namely, the optimal placement conditions under which the arc discharge to the materials to be welded can be performed reliably, and deposition of the metal vapor on the tip of the arc electrode can be prevented.

II) A welding system comprising:

a plurality of welding stages each having a table forming a horizontal surface on which materials to be welded are placed, and being disposed adjacent to each other;

a horizontal beam supported at both ends by vertical end struts, and disposed horizontally like a bridge over the welding stages;

an intermediate strut supporting an intermediate site of the horizontal beam between the adjacent welding stages;

a carriage traveling horizontally on the horizontal beam;

a plurality of reference position locating means each having a reference plate which is contacted by an end surface of one of the materials to be welded, while protruding upward from an upper surface of each table, to position the end surface of the material to be welded, prior to butt welding for butting the end surfaces of the materials placed on the upper surface of each table and welding the end surfaces together, and which retreats downward from the upper surface of each table during welding;

a plurality of transport means for materials to be welded, adapted to transport the material to be welded, which has been placed on the upper surface of each table, toward the reference plate, or the end surface of the one of the materials to be welded whose positioning has been completed upon contact with the reference plate;

a welding head loaded on the carriage, and moved along a weld line together with the carriage to weld a weld area of the materials to be welded which have been placed on the welding stages, and wherein the welding head is a laser/arc combined welding head for simultaneously performing laser light irradiation and arc discharge of the materials to be welded, thereby welding the materials to be welded, further includes arc electrode position adjusting means for moving an arc electrode in a direction perpendicular to a direction of an optical axis of laser light applied to the materials to be welded, thereby adjusting the position of the arc electrode in the perpendicular direction relative to the position of irradiation with laser light in the materials to be welded, and is configured such that in accordance with movement in one direction of the carriage located at one of the ends of the horizontal beam as an initial position, the welding head welds the material, to be welded, on each welding stage at a predetermined welding speed, and upon completion of welding of the materials, to be welded, on all the stages as a result of movement to the other end of the horizontal beam, the welding head moves in the opposite direction at a higher speed than the welding speed, arrives at the initial position, and performs a predetermined welding operation while moving again toward the other end along the horizontal beam.

According to this invention, the materials, to be welded, on the plurality of welding stages can be butt welded by the single welding head traveling together with the single carriage, in addition to the effects of the invention described in I). Therefore, the efficiency of the welding operation increases dramatically. Furthermore, the horizontal beam on which the carriage moves can be converted to a rigid structure by use of the intermediate strut. Thus, even when the carriage on the horizontal beam moves at a high speed, associated vibrations of the horizontal beam can be suppressed, and the welding head can be fed accurately along the weld line. That is, the effect of achieving high speed movement of the carriage, and the effect of maintaining a high welding accuracy can be realized at the same time.

III) The welding system of II) above characterized in that one weld state detection sensor for detecting whether the state of weld is good or poor is disposed on the carriage downstream from the welding head in a moving direction during welding.

According to this invention, the state of weld is detected only during movement of the welding head in one direction. As a result, only one weld state detection sensor, which is expensive, is used. Thus, cost reduction can be achieved.

IV) The welding system described in II) or III) above characterized in that the carriage is moved by drive means and moving means composed of a pinion bonded to a rotating shaft of the drive means, and a rack disposed on an upper surface of the horizontal beam from one end to the other end of the upper surface and engaged with the pinion.

According to this invention, the moving parts, such as carriage and welding head, are moved by transmitting a rotating force to the rack via the pinion. The moving speed of the carriage can be made much higher than the use of a ball screw. Incidentally, the use of the ball screw gives a traveling speed of 110 m/mm at the highest, while the use of the rack and pinion can achieve a high speed of 240 m/min, when the moving part such as carriage weighs about 300 Kg.

In the welding systems described in I to IV) above, the welding head may be as follows:

1) A laser/arc combined welding head for simultaneously performing laser light irradiation and arc discharge of the materials to be welded, thereby welding the materials to be welded, and further including arc electrode inclination angle adjusting means for inclining an arc electrode relative to a laser light irradiation position in the materials to be welded, thereby adjusting an inclination angle of the arc electrode relative to the laser light irradiation position.

According to this invention, there can be selected optimal conditions for placement of the arc electrode at the inclination angle, namely, the optimal placement conditions under which the arc discharge to the materials to be welded can be performed reliably, and deposition of the metal vapor on the tip of the arc electrode can be prevented.

2) A laser/arc combined welding head for simultaneously performing laser light irradiation and arc discharge of the materials to be welded, thereby welding the materials to be welded, and further including arc electrode distance adjusting means for bringing an arc electrode close to or away from a laser light irradiation position in the materials to be welded, thereby adjusting a distance between the laser light irradiation position and the arc electrode.

According to this invention, there can be selected optimal conditions for placement in connection with the distance between the laser light irradiation position and the arc electrode, namely, the optimal placement conditions under which the arc discharge to the materials to be welded can be performed reliably, and deposition of the metal vapor on the tip of the arc electrode can be prevented.

3) A laser/arc combined welding head for simultaneously performing laser light irradiation and arc discharge of the materials to be welded, thereby welding the materials to be welded, and further including an arc electrode adjusting mechanism composed of arc electrode position adjusting means for moving an arc electrode in a direction perpendicular to a direction of an optical axis of laser light applied to the materials to be welded, thereby adjusting the position of the arc electrode in the perpendicular direction relative to a laser light irradiation position in the materials to be welded, arc electrode inclination angle adjusting means for inclining the arc electrode relative to the optical axis of laser light, thereby adjusting the inclination angle of the arc electrode, and arc electrode distance adjusting means for bringing the arc electrode close to or away from the laser light irradiation position in the materials to be welded, thereby adjusting a distance between the laser light irradiation position and the arc electrode.

According to this invention, meticulous adjustment for placement of the arc electrode is made by the arc electrode adjusting mechanism, thus making it possible to select optimal placement conditions under which the arc discharge to the materials to be welded can be performed reliably, and deposition of the metal vapor on the tip of the arc electrode can be prevented.

4) In the welding head of 3) above, the arc electrode adjusting mechanism comprises a pair of flange mounting surfaces formed parallel on both sides of a nozzle of the welding head, and having elongated holes elongated in the direction of the optical axis of laser light to be applied to the materials to be welded, opposite ends of an arc electrode support member being inserted through the elongated holes, first flanges each having elongated holes elongated in the direction of the optical axis, being fixed to the flange mounting surface by screws via the elongated holes, having a hole of such a size that the arc electrode support member is tiltable, the opposite ends of the arc electrode support member being inserted through the holes, first seal members each interposed between the flange mounting surface and the first flange, and surrounding the periphery of the elongated hole of the flange mounting surface, second flanges each fixed to an outer surface of the first flange by screws, having a hole larger than the hole of the first flange for insertion of the opposite ends of the arc electrode support member, and having a protrusion in a portion outside the hole, the protrusion protruding inward over an entire periphery, having an inner periphery larger than an outer periphery of the arc electrode support member, and allowing the arc electrode support member to tilt, and second seal members each disposed along an inner peripheral surface of the hole of the second flange to surround the outer periphery of the arc electrode support member, and squeezed by the protrusion of the second flange when the screws are tightened to fix the second flange to the first flange, thereby closing a gap between the arc electrode support member and the second flange, and fixing the arc electrode support member by a reaction force.

According to this invention, meticulous adjustment for placement of the arc electrode is made, thus making it possible to select optimal placement conditions under which the arc discharge to the materials to be welded can be performed reliably, and deposition of the metal vapor on the tip of the arc electrode can be prevented.

5) In the welding head of 3) above, the arc electrode adjusting mechanism comprises a support member for pivotably supporting an arc electrode support member, a first vertical slide guide fixed to a side portion of a nozzle of the welding head, a second vertical slide guide guided by the first vertical slide guide in the direction of the optical axis of laser light applied to the materials to be welded, a cross feed screw screwed to the first vertical slide guide, and having a front end portion rotatably joined to the support member to move the arc electrode in the direction perpendicular to the direction of the optical axis together with the support member and the arc electrode support member, a swing feed screw screwed to the first vertical slide guide, and having a front end portion rotatably and pivotably joined to the arc electrode support member to pivot the arc electrode together with the arc electrode support member, and a vertical feed screw screwed to the first vertical slide guide, and having a front end in contact with a bottom surface of the second vertical slide guide to move the arc electrode in the direction of the optical axis together with the second vertical slide guide, the support member, and the arc electrode support member.

According to this invention, meticulous adjustment for placement of the arc electrode is made, thus making it possible to select optimal placement conditions under which the arc discharge to the materials to be welded can be performed reliably, and deposition of the metal vapor on the tip of the arc electrode can be prevented.

6) A laser/arc combined welding head for simultaneously performing laser light irradiation and arc discharge of the materials to be welded, thereby welding the materials to be welded, and including gas flow generating means provided in a support portion of an arc electrode for generating and ejecting a gas flow along an axis of the arc electrode.

According to this invention, deposition of the metal vapor on the tip of the arc electrode can be reliably prevented, and satisfactory laser/arc combined welding can be performed.

7) Any of the welding heads described above,
including gas flow generating means provided in a support portion of an arc electrode for generating and ejecting a gas flow along an axis of the arc electrode.

According to this invention, optimal conditions for placement of the arc electrode can be selected, deposition of the metal vapor on the tip of the arc electrode can be reliably prevented, and satisfactory laser/arc combined welding can be performed.

8) A laser/arc combined welding head for simultaneously performing laser light irradiation and arc discharge of the materials to be welded, while disposing an arc electrode outside laser light, thereby welding the materials to be welded, and
further including gas flow generating means provided in a support portion of the arc electrode for generating and ejecting a gas flow along an axis of the arc electrode, with the arc electrode being disposed outside the laser light in the same welding head.

According to this invention, compactness of the welding apparatus can be achieved, deposition of the metal vapor on the tip of the arc electrode can be reliably prevented, and satisfactory laser/arc combined welding can be performed.

9) The welding head of 8) above, wherein
a plurality of the arc electrodes are attached to a ring-shaped support member, which surrounds the laser light, with predetermined spacing in a circumferential direction, and can be used selectively according to the direction of welding.

According to this invention, deposition of the metal vapor on the tip of the arc electrode can be reliably prevented, and satisfactory laser/arc combined welding can be performed.

10) A laser/arc combined welding head for simultaneously performing laser light irradiation and arc discharge of the materials to be welded, thereby welding the materials to be welded, wherein
an arc electrode is disposed downstream from a laser light irradiation position in a direction of movement of the welding head.

According to this invention, deposition of the metal vapor on the tip of the arc electrode can be reliably prevented, and satisfactory laser/arc combined welding can be performed.

11) A laser/arc combined welding head for simultaneously performing laser light irradiation and arc discharge of the materials to be welded, thereby welding the materials to be welded, wherein
an arc electrode is disposed downstream from a laser light irradiation position in a direction of movement of the welding head.

According to this invention, deposition of the metal vapor on the tip of the arc electrode can be reliably prevented, and satisfactory laser/arc combined welding can be performed.

The reference position locating means in the welding systems described in I) to IV) above is as follows:

12) The reference position locating means configured such that
a second table is divided so as to be contactable with or separable from a first table, the first table bearing one of the materials to be welded, and the second table bearing the other material to be welded which is butt welded to the one material to be welded,
in positioning the end surface of the one material to be welded, the reference plate is protruded upward from the upper surface of the first table, with the second table being separated from the first table, and
after completion of a positioning operation for the end surface of the one material to be welded, the reference plate is retreated downward from the upper surface of the first table, and the second table is moved toward the first table, whereupon its end surface contacts the end surface of the first table, thereby closing a space above the retreated reference plate.

According to this invention, the reference plate during welding can be retreated into the space closed upward. Consequently, welding powder during welding does not become an obstacle to the ascent and descent of the reference plate, and the positioning accuracy for the reference plate can be easily rendered sufficiently high.

13) The reference position locating means of 12) above, wherein
in a portion of contact between the first table and the second table, the end surface of one of the tables forms a protrusion protruding horizontally toward the end surface of the other table, and the end surface of the other table forms a concavity to be fitted with the protrusion.

According to this invention, welding can be performed, with the protrusion being fitted into the concavity. Thus, the space in which the reference plate has retreated can be completely separated from welding powder. Consequently, the effects of the invention described in 12) above can be obtained reliably.

14) The reference position locating means of 12) or 13) above, wherein
the reference plate is fastened to a front end portion of a lever rotating normally and reversely about a point below the upper surface of the first table as a center of rotation, and is constituted such that as the lever rotates in one direction, the reference plate rotates until the lever partly contacts the end surface of the first table to restrain the rotation, whereupon the reference plate protrudes above the upper surface of the first table, and as the lever rotates in the opposite direction, the reference plate retreats below the upper surface of the first table.

According to this invention, the reference table can be moved upward and downward by rotation of the lever. Consequently, the space for ascent and descent of the reference plate can be minimized. This leads to the effect that the space below the table, in which various instruments are arranged complexly, can be utilized effectively and rationally.

15) The reference position locating means of 14) above, wherein
the lever is rotated by driving of an air cylinder having a piston rod whose front end is connected to an intermediate site of the lever.

According to this invention, rotation of the lever can be made by extension and contraction of the piston rod. Consequently, the same effects as in 13) above can be expected, and these effects can be realized concretely.

16) The reference position locating means of 14) or 15) above, wherein
the end surface of a bolt screwed to the lever such that the amount of protrusion of the bolt from the end surface of the lever is adjustable contacts the end surface of the first table to restrain the rotation of the lever.

According to this invention, adjustment of the ascent position of the lever according to rotation is made by adjusting the amount of protrusion of the bolt. Consequently, mere adjustment of the bolt can result in the positioning of the reference plate, thus facilitating the adjusting operation.

The transport means in the welding systems described in I) to IV) described above is as follows:

17) The transport means has a plurality of transport arms, and is configured such that the plurality of transport arms are moved parallel toward a material to be welded, which is an odd-shaped member; each time a welded material detection sensor of each transport arm detects the material to be welded, drive means of the transport arm is driven to grasp an end portion of the material, to be welded, between an upper lever and a lower lever of the transport arm and detect a state of grasp by a grasp state detection sensor; and after a state of grasp by all the transport arms of the material to be welded is detected, each transport arm is moved parallel in the same amount to transport the material to be welded up to a predetermined position, the transport arm includes a bench having the welded material detection sensor at a front end thereof, and adapted to move toward the odd-shaped material to be welded, the drive means disposed on the bench, the lower lever caused to protrude forward from the bench by driving of the drive means, and rotating in one direction relative to the bench to contact the odd-shaped material, to be welded, from below the material to be welded, and the upper lever caused to protrude forward from the bench, integrally with the lower lever, upon driving of the drive means, and rotating in the opposite direction relative to the bench to contact the material, to be welded, from above the material to be welded, and after the welded material detection sensor detects the material to be welded, the upper lever and the lower lever are rotated, whereby the end portion of the material to be welded is grasped between the upper lever and the lower lever.

According to this invention, a predetermined grasping action is started when the plate material detection sensor senses the presence of the plate material, and the plate material can be grasped between the upper lever and the lower lever. Thus, no matter what shape the plate material has, the plate material can be grasped satisfactorily. That is, even if one of the materials to be butt welded is an odd-shaped plate material, this plate material can be butted automatically and satisfactorily against the welding end surface of the other material to be welded. Consequently, the welding system is a particularly useful system as a tailored blank welding apparatus for steel plates and as a butt welding apparatus for steel sheets.

The transport arm in 17) above may be configured as follows:

18) The transport arm of 17) above, wherein the bench includes a horizontal base plate, a vertical member provided vertically on the base plate, and a support member protruding forward from the front end of the vertical member to support an odd-shaped plate material from below by a front end portion thereof and having a plate material detection sensor disposed for detecting the odd-shaped plate material, and the bench is also fastened to an air cylinder as drive means, the air cylinder is adapted to extend or contract its piston rod in a horizontal direction to move a moving member, which is fastened to the front end of the piston rod, linearly in a horizontal direction on the base plate, the lower lever has its base end portion attached pivotably to the moving member via a pin, and a pin disposed midway through the lower lever is fitted into an elongated hole provided in a longitudinal direction of the vertical member, whereby the lower level follows the shape of the elongated hole and moves as the moving member moves, the upper lever is attached pivotably to a middle portion of the lower level via a pin, contacts a contact member of the bench according to forward movement of the moving member, and rotates toward the lower lever about the pin as a center of rotation in accordance with further forward movement, according to forward movement toward the odd-shaped plate material, the plate material detection sensor detects the odd-shaped plate material, at the position of detection, movement of the bench is stopped and the air cylinder is driven to move the moving member forward, and according to this forward movement, the lower lever and the upper lever are rotated in opposite directions, whereby the end portion of the odd-shaped plate material is grasped between the upper lever and the lower lever.

According to this invention, simply by driving the air cylinder to extend its piston rod, thereby moving the moving member linearly, the lower lever acts to support the plate material from below. Moreover, the upper lever rotating upon contact with the contact member rotates from above and contacts the upper surface of the material to be welded, whereby the material to be welded can be grasped between the upper lever and the lower lever. Consequently, regardless of the shape of the material to be welded, this material can be grasped satisfactorily. This grasping action can be performed simply by driving of the air cylinder. Thus, the mechanism for the grasping action can be rendered most rational.

19) The transport arm of 17) or 18) above, wherein a spring is provided between the upper lever and the lower lever, and the spring force of the spring is adjusted to adjust a grasping force for the odd-shaped material to be welded which is grasped between the upper lever and the lower lever.

According to this invention, the grasping force for the plate material grasped by the upper arm and the lower arm can be adjusted freely. As a result, when the material to be welded being grasped by the transport arms is butted against the other material to be welded, a slip occurs between the upper arm/lower arm and the material to be welded, so that some misalignment with the butt end surface of the material to be welded can be accommodated.

BRIEF DESCRIPTION OF THE DRAWINGS

FIG. 17(a) is a sectional view taken on line H—H of FIG. 15, and

FIG. 17(b) is a sectional view taken on line I—I of FIG. 17(a).

FIG. 18(a) is a sectional view taken on line J—J of FIG. 15, and

FIG. 18(b) is a partially cutaway view taken in the direction of K in FIG. 18(a).

FIGS. 28(a) and 28(b) are views showing, in an extracted form, a reference plate of a reference position locating mechanism, and portions close to the reference plate, FIG. 28(a) being a perspective view showing a reference plate 12 protruded from the upper surface of a table 3, and FIG. 28(b) being a cross sectional view showing the reference plate 12 retreated from the upper surface of the table 3.

BEST MODE FOR CARRYING OUT THE INVENTION

Embodiments of the present invention will now be described in detail based on the accompanying drawings.

Figure 1:
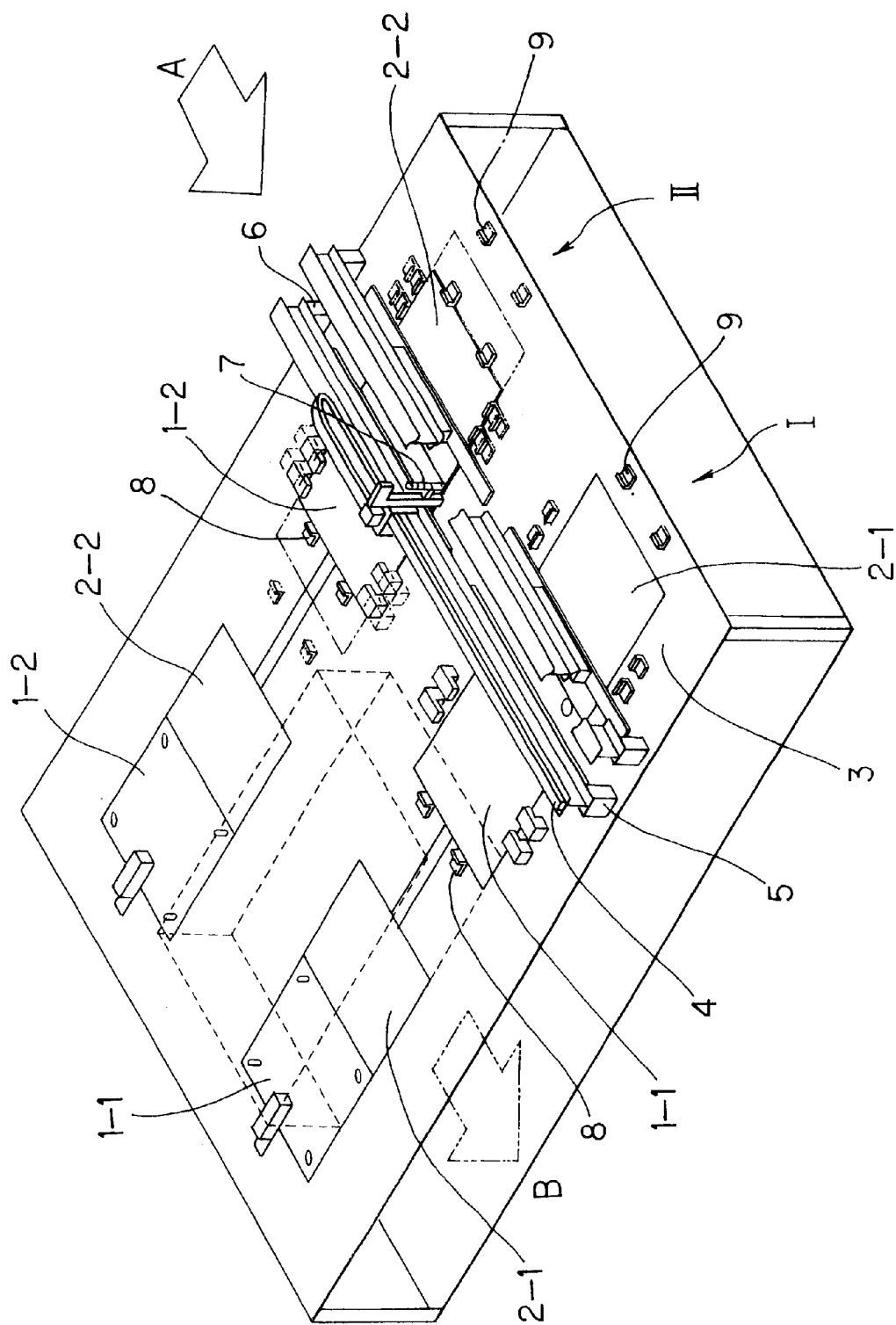
FIG. 1 is an explanation drawing conceptually showing a welding system according to an embodiment of the present invention having two welding stages.

FIG. 1 is an explanation drawing conceptually showing a welding system according to the present embodiment. As shown in the drawing, the present system has two welding stages I and II for performing the same butt welding operation. The number of the welding stages I and II has no particular limitations, but if the number is two, the work efficiency obtained is twice as high as that when the number is one. Therefore, the number may be selected in view of the desired work efficiency.

The welding stages I and II are arranged adjacently, and have a common table 3 forming a horizontal surface on which steel plates 1-1, 2-1, 1-2, 2-2, materials to be welded, are placed. A horizontal beam 4 is supported at both ends by vertical end struts 5, 6, and is disposed horizontally like a bridge over the welding stages I and II. A carriage 7 bears a welding head (not shown in FIG. 1), and travels on the horizontal beam 4. A welding operation is performed by the welding head moving along a weld line as the carriage 7 travels.

In this welding system, the steel plates 1-1, 2-1 are carried in by a carry-in device having suction attracting means (not shown), etc. via a carry-in port A, and placed on the table 3 of the welding stage I. The steel plates 1-2, 2-2 are similarly carried in via the carry-in port A, and placed on the table 3 of the welding stage II.

Then, moving claws 8, 9 of a transport device are moved to carry out predetermined positioning, such as butting of end surfaces of the steel plates 1-1, 2-1 and the steel plates 1-2, 2-2 (this butting operation will be described in detail later). In this state, the carriage 7 is caused to travel, and the butted portions are welded. The transport device transports the steel plates 1-1, 2-1, 1-2, 2-2, the materials to be welded, toward a reference plate of a reference position locating mechanism (not shown in FIG. 1), or toward the end surface of one of the materials to be welded whose positioning has been completed upon contact with the reference plate.

The steel plates 1-1, 2-1 and the steel plates 1-2, 2-2 after completion of butt welding are moved in an upper left direction in FIG. 1, which is perpendicular to the weld line, and are further moved leftward from this position and carried outward through a carry-out port B.

Figure 2:
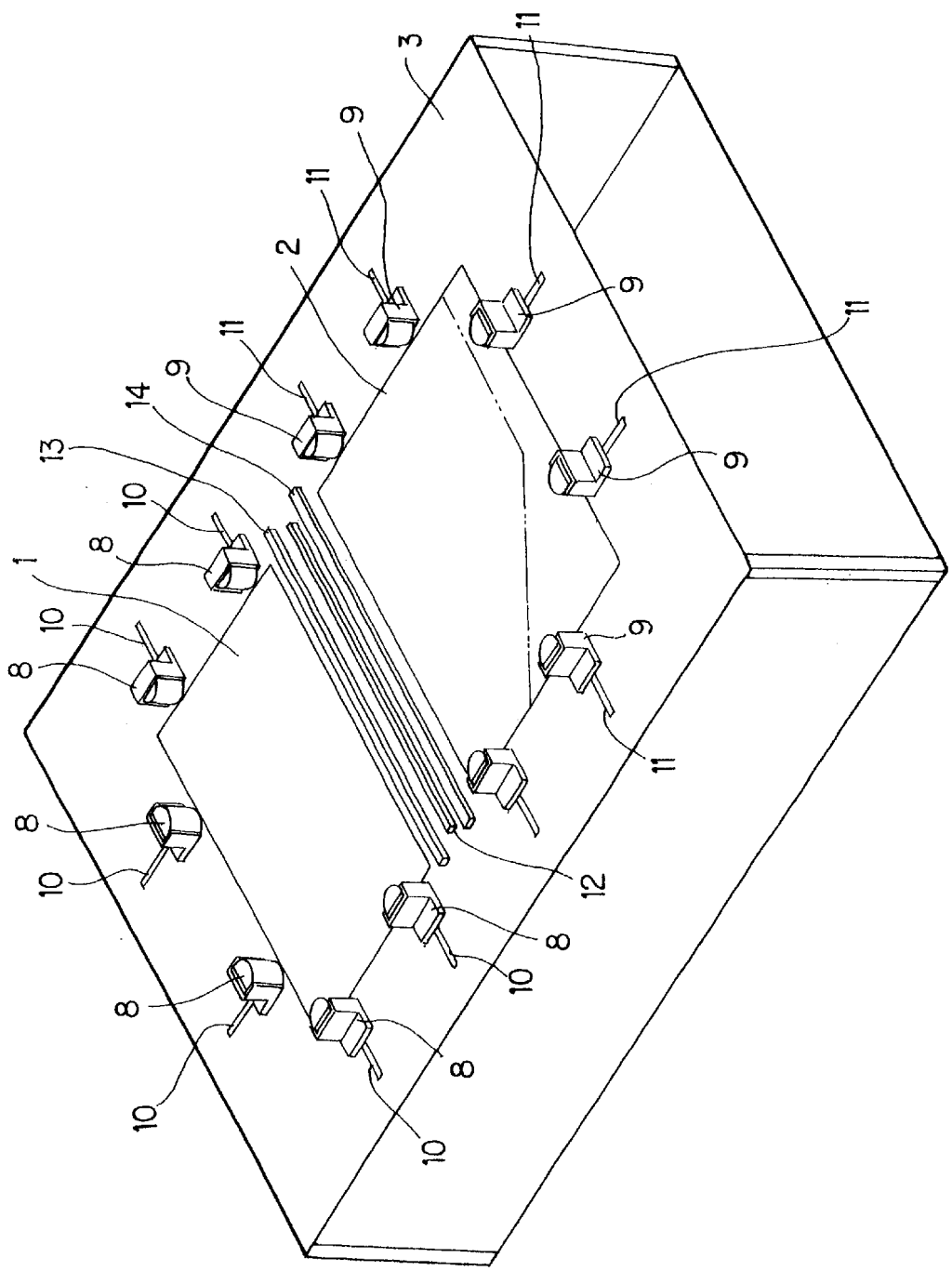
FIG. 2 is an explanation drawing conceptually showing a mode of a positioning operation for steel plates, materials to be welded, on one welding stage in the embodiment shown in FIG. 1.

FIG. 2 is an explanation drawing conceptually showing a mode of a positioning operation for steel plates, materials to be welded, on the welding stage I or II. As shown in the drawing, two steel plates 1 and 2, which are to be butt welded, are placed on the table 3 constituting a horizontal surface, and are designed to be positioned at predetermined positions by the moving claws 8, 9 of the transport device linearly moving while contacting the end surfaces of the steel plates 1, 2. The moving claws 8, 9 move along grooves 10, 11 provided in the table 3.

In more detail, the moving claws 8 are first moved to locate positions in a width direction (the direction of the weld line) and a longitudinal direction (the direction perpendicular to the weld line) at predetermined positions. The positioning in the width direction is performed by moving the moving claws 8, which are opposed to each other in contact with the end surfaces in the width direction of the steel plate 1, to the predetermined position. Whereas the positioning in the longitudinal direction is performed by moving the two moving claws 8 in contact with the end surface in the longitudinal direction of the steel plate 1 toward a reference plate 12 of a reference position locating mechanism to bring the steel plate 1 into contact with the reference plate 12. The reference position locating mechanism is configured such that prior to butt welding of the materials to be welded, which are placed on the upper surface of the table 3, the end surface of one of the materials to be welded is brought into contact with the reference plate 12 protruded upward from the upper surface of the table 3, whereby the end surface of this material to be welded is positioned, and at the time of welding, the reference plate 12 is retreated from the upper surface of the table 3 downwardly of the table 3. After positioning of the one steel plate 1 is completed upon its contact with the reference plate 12, the reference plate 12 is retreated downward from the upper surface of the table 3. In this state, the moving claws 9 are moved to set the positions in the width direction (the direction of the weld line) and longitudinal direction (the direction perpendicular to the weld line) of the steel plate 2 at the predetermined position. At this time, the positioning in the width direction is performed, similar to the steep plate 1, by moving the moving claws 9, which are opposed to each other in contact with the end surfaces in the width direction of the steel plate 2, to the predetermined position. Whereas the positioning in the longitudinal direction is performed by moving the two moving claws 9 in contact with the end surface in the longitudinal direction of the steel plate 2 toward the butt end surface of the steel plate 1, and bringing the steel plate 2 into contact with this end surface.

After positioning of the steel plates 1, 2 is completed, hold-down fittings 13, 14 are lowered to press the ends of the steel plates 1, 2 from above, thereby clamping them. In this state, butted portions of the steel plates 1 and 2 are welded, with a welding head being moved along a butt line (weld line) of the steel plates 1, 2.

Figure 3:
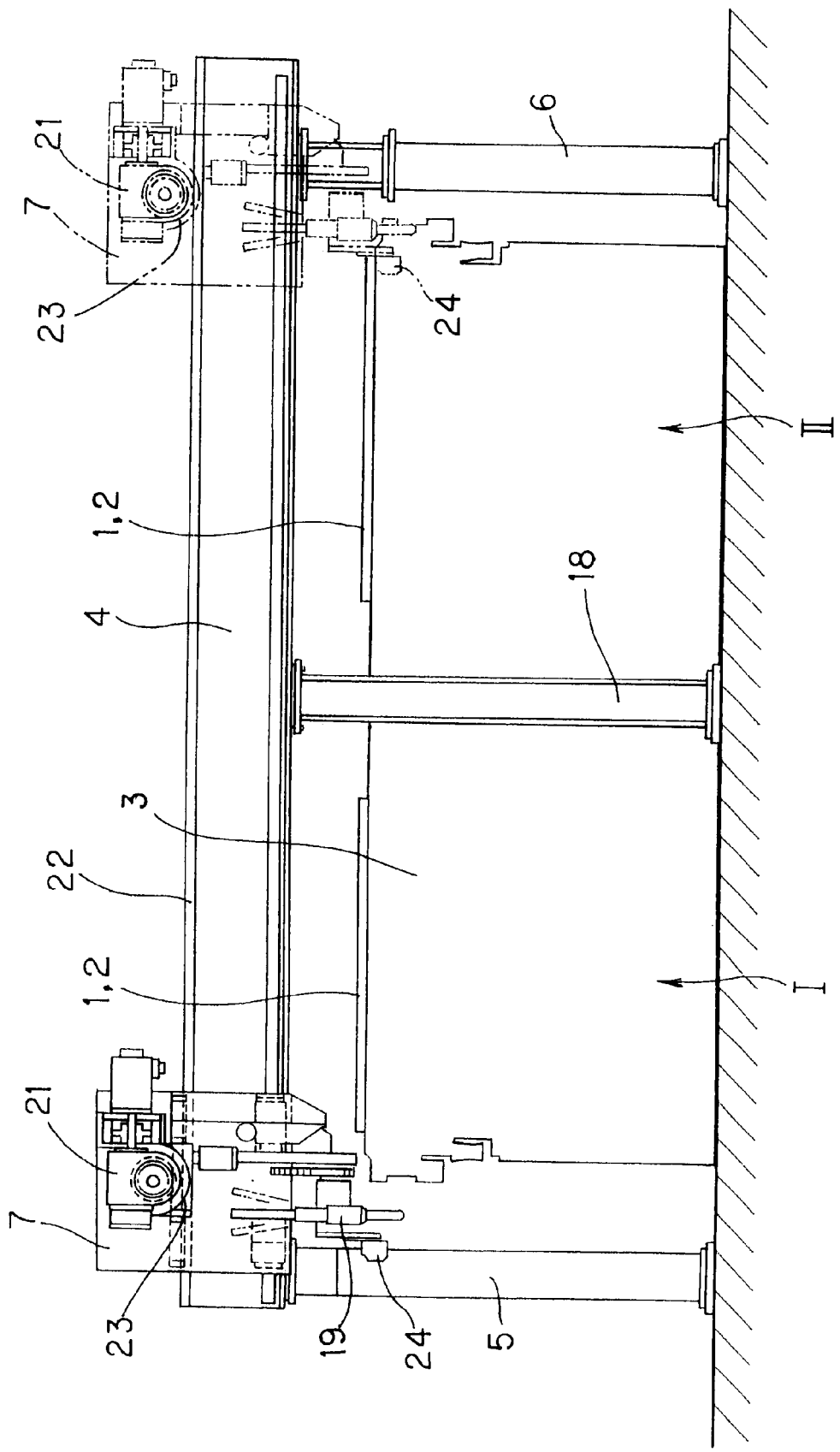
FIG. 3 is a front view showing the welding system according to the present embodiment.

FIG. 3 is a front view showing the welding system according to the present embodiment. As shown in the drawing, the horizontal beam 4 is supported at both ends by the vertical end struts 5 and 6, and disposed like a bridge over the welding stages I and II. A midway portion of the horizontal beam 4 is supported and reinforced by an intermediate strut 18 disposed between the adjacent welding stages I and II to achieve a rigid structure of a travel path for the carriage 7 bearing a welding head 19. The carriage 7, coupled with an electric motor 21 and the welding head 19 installed thereon, constitutes a moving unit which moves along the horizontal beam 4. A rack 22 is disposed on an upper surface of the horizontal beam 4 over a range from one of its ends to the other end, and a pinion 23 meshes with the rack 22. The pinion 23 is fastened to a rotating shaft of the electric motor 21. Thus, the pinion 23 rotates in accordance with driving of the electric motor 21, whereby the moving unit linearly moves along the rack 22, permitting a welding operation along a predetermined weld line to be performed.

A weld state detection sensor 24 is a sensor for detecting whether the welded state is good or poor, and only one sensor 24 is disposed on the carriage 7 downstream from the welding head 19 in the direction of movement during welding. According to the welding system of the present embodiment, therefore, a welding operation is performed only during movement from the left end toward the right end in the drawing. In the reverse direction, the carriage 7 is moved when it is returned to the initial position. The faster the speed of this returning movement, the shorter the tact time can be made, and the higher efficiency can be obtained for the welding operation. Thus, the welding speed is, for example, 8 m/min, while the returning speed of the carriage 7 can be made as high as 240 m/min, for instance.

In the above embodiment, in accordance with the movement in one direction of the carriage 7 with its initial position set at one end (left end in the drawing) of the horizontal beam 4, the steel plates 1 and 2, materials to be welded, on the welding stages I and II, are welded at a predetermined welding speed. This welding is followed by the detection with the weld state detection sensor 24 of whether the welded state is good or poor. Then, the carriage 7 arrives at the other end (right end in the drawing) of the horizontal beam 4, when welding of the materials, to be welded, on the welding stages I and II is completed. At this time, the carriage 7 moves in the reverse direction at a higher speed than the welding speed, reaching the initial position. In this state, preparations are made for a next welding operation.

When butt welding is performed using the welding system having a plurality of welding stages I and II, as described above, it is necessary to evaluate simultaneously whether the weld zone is good or poor, and to stop delivery of the steel plates 1, 2 having caused a poor weld, if any. For this purpose, the weld state detection sensor 24 for detecting whether the welded state is good or poor needs to be provided downstream from the carriage (welding head) 7 in the direction of its travel during welding. Since this weld state detection sensor 24 is an expensive device, its use is desirably restricted to only one. In the present embodiment, therefore, the number of the weld state detection sensor 24 is rendered one, thereby reducing the cost. Instead, there is no choice but to perform a welding operation only when the carriage 7 is traveling in one direction from one end toward the other end of the horizontal beam 4. That is, a welding operation cannot be performed during travel in the reverse direction.

To increase the welding efficiency, on the other hand, a short tact time should be realized. For this purpose, increasing the welding speed is necessary, needless to say. At the same time, after the welding operation according to movement of the carriage 7 in one direction is completed, the carriage 7 needs to be promptly moved in the reverse direction and brought to the initial position, for the quickest shift possible toward the next welding operation mode. That is, the moving speed for a return should be as high as possible. As a result, the weights of the carriage 7 and the moving unit moving integrally therewith become great because of upsizing of the drive means, such as drive motor. The horizontal beam 4 is disposed like a bridge over the two welding stages I and II, and so it is long and large. Its natural frequency is also high.

Consequently, the heavy weight carriage 7 needs to be run on the long and large horizontal beam 4 at a high speed, and great vibrations are thus caused to the horizontal beam 4. Such vibrations cause swings to the welding head, adversely affecting the welding accuracy. When the tailored blank is to be obtained by welding with the laser welding head 19, an accuracy of the order of 100 µm is necessary.

According to the present embodiment, the intermediate strut 1 is used to make the horizontal beam 4 a rigid structure, and the rack 22 and the pinion 23 are used as the moving means for the carriage 7, thus permitting the desired high speed movement.

Embodiments on the Welding Head

Next, embodiments of the welding head 19 preferably applicable to the present embodiment will be described.

First Embodiment

Figure 4:
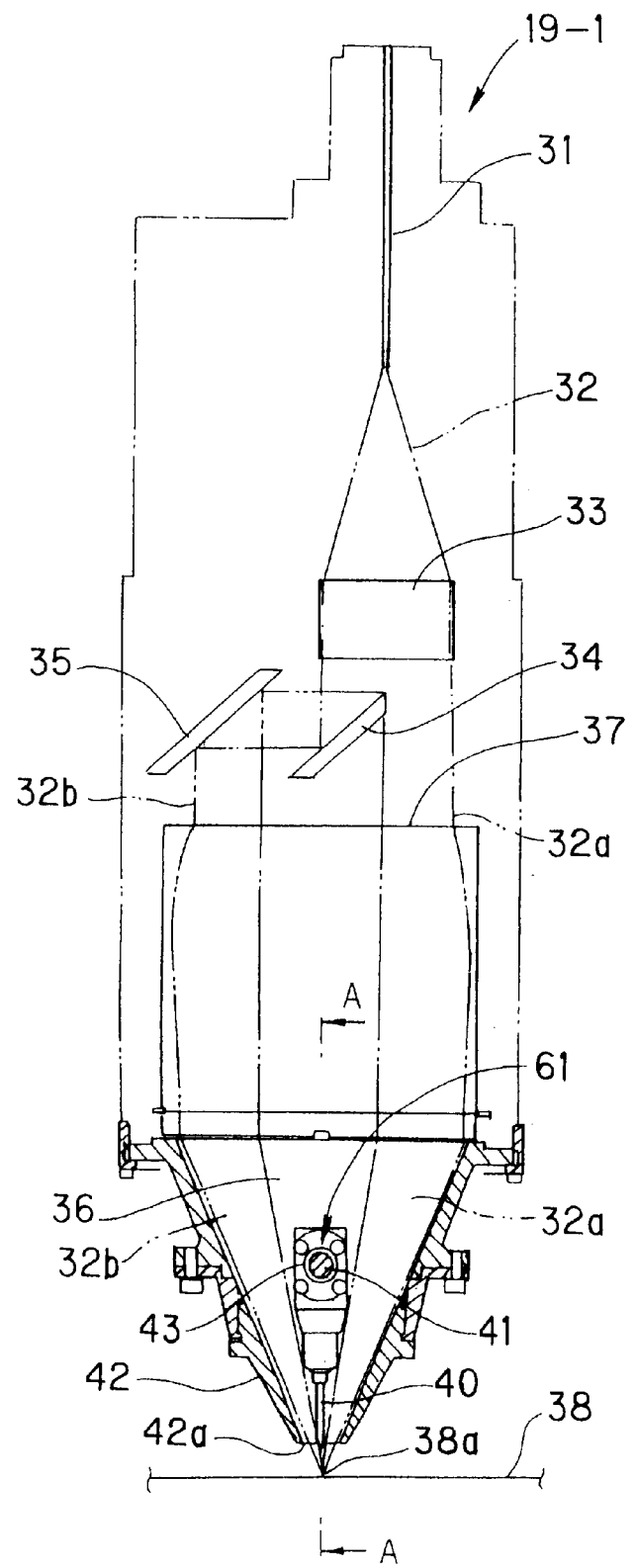
FIG. 4 is a sectional view of a laser/arc combined welding head according to a first embodiment of the present invention.
Figure 5:
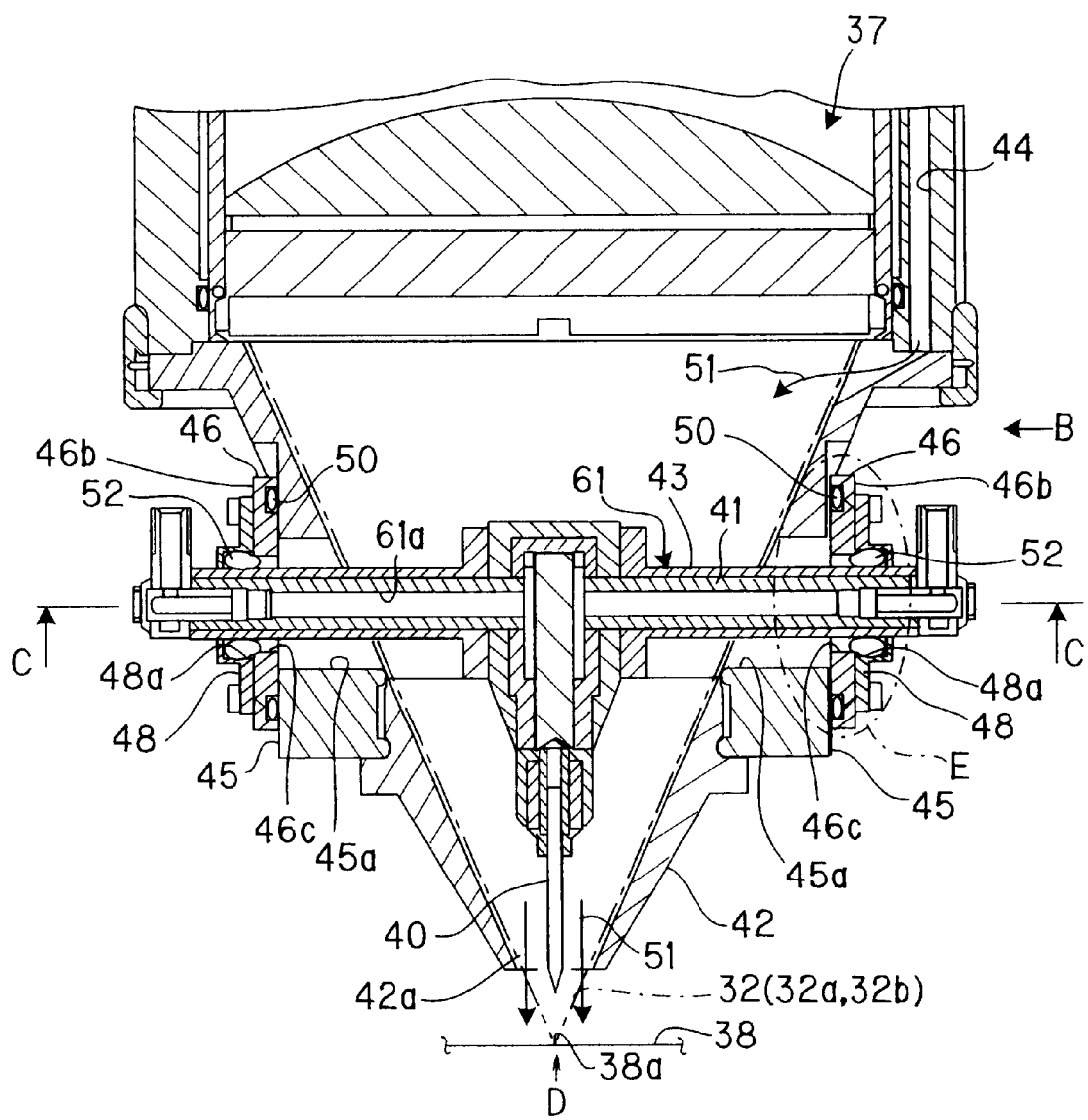
FIG. 5 is an enlarged sectional view taken on line A—A of FIG. 4.
Figure 6:
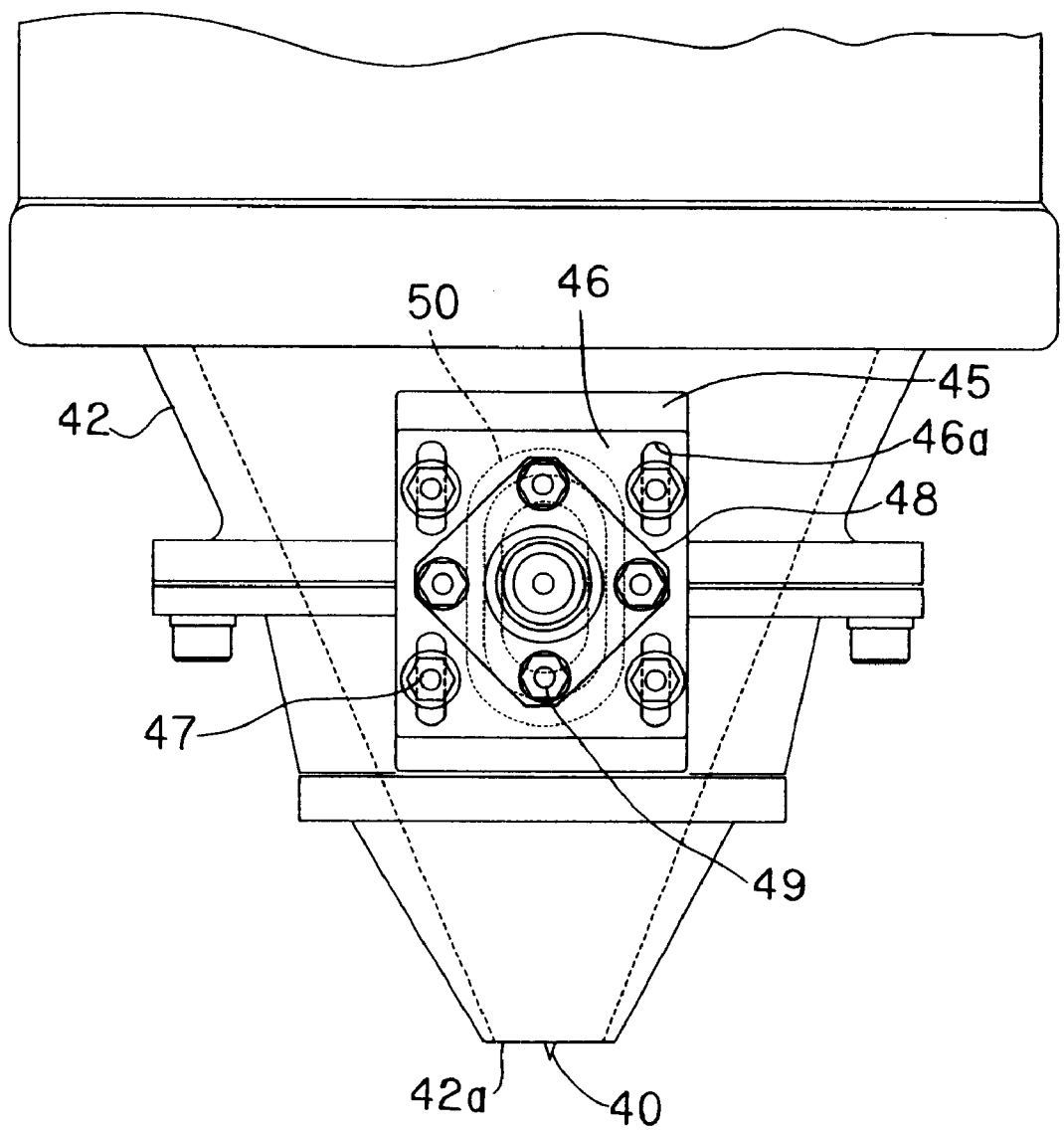
FIG. 6 is a view taken in the direction of B in FIG. 5.
Figure 7:
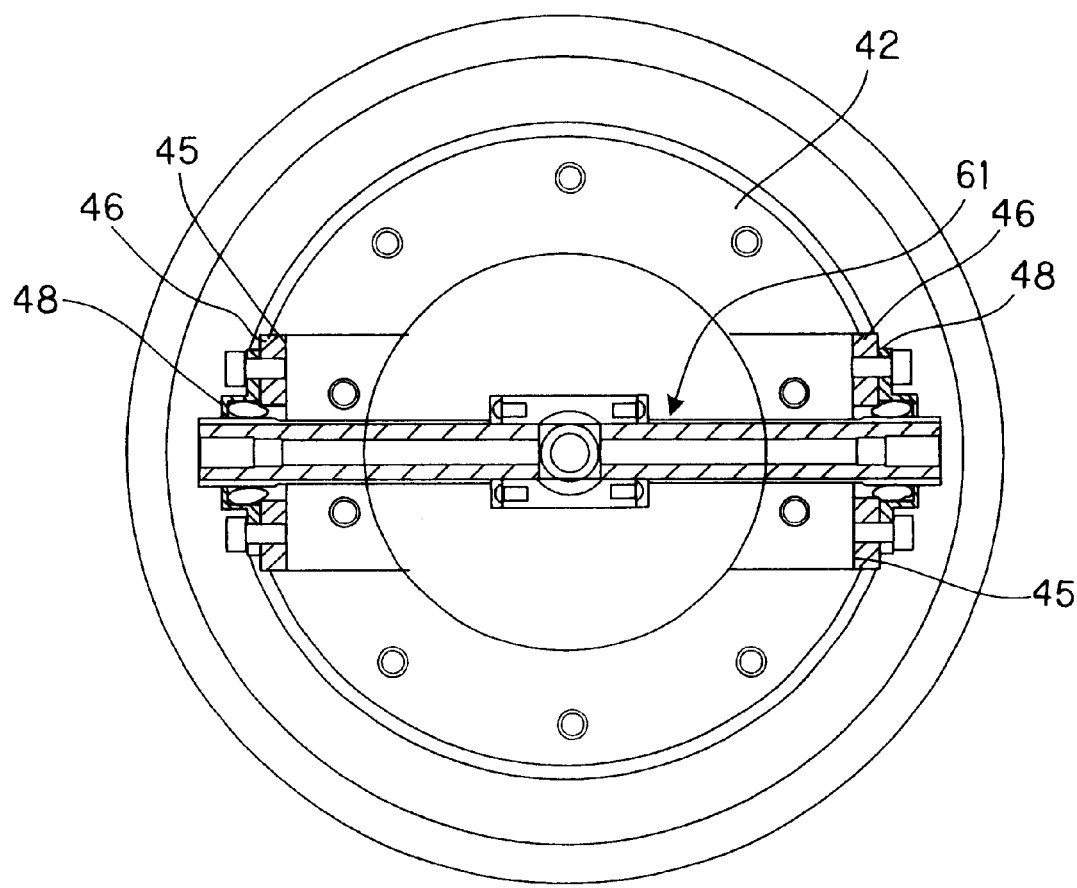
FIG. 7 is a sectional view taken on line C—C of FIG. 5.
Figure 8:
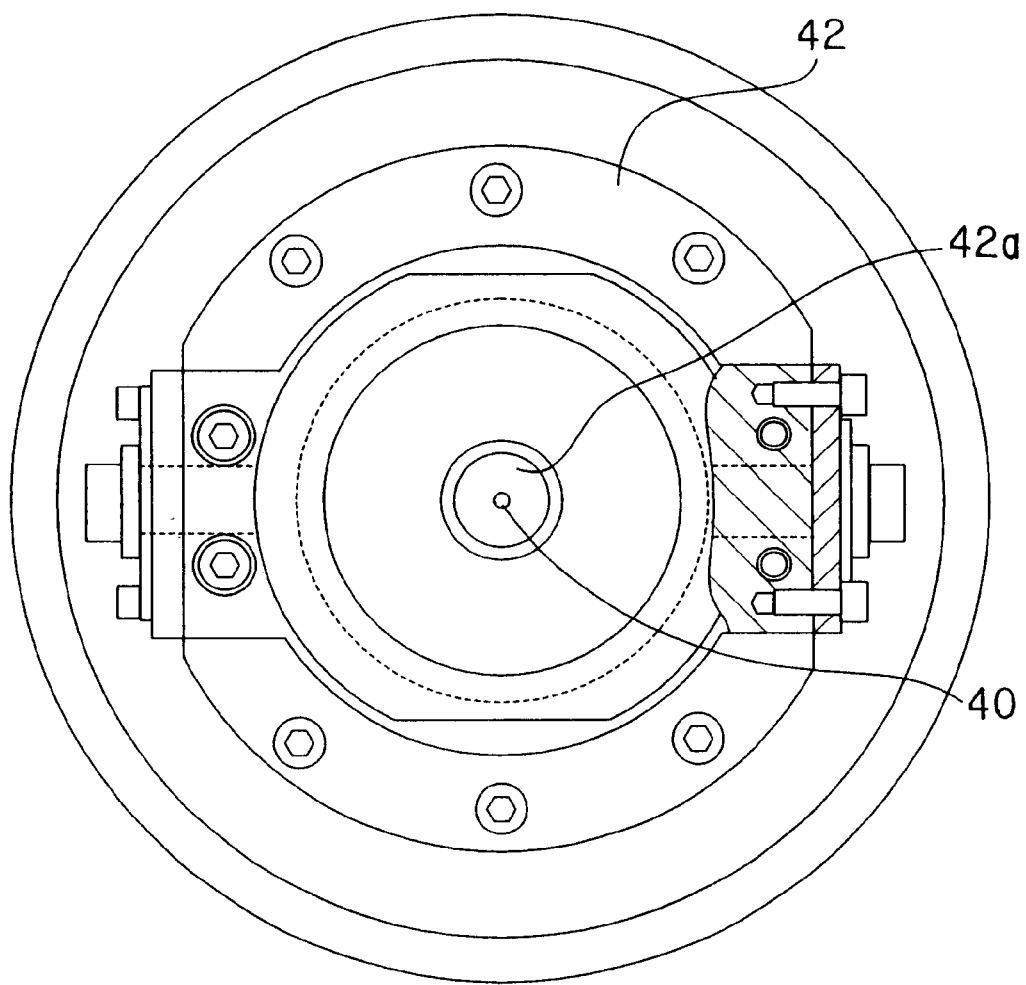
FIG. 8 is a partially cutaway view taken in the direction of D in FIG. 5.
Figure 9:
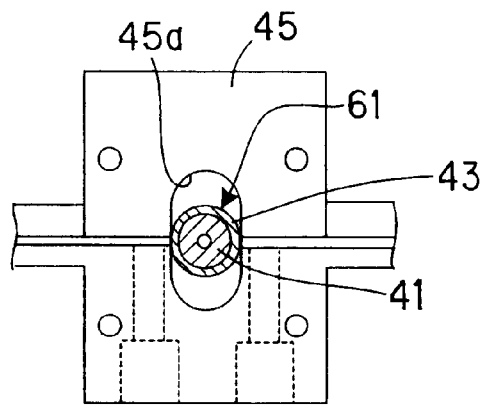
FIG. 9 is a structural view of a flange mounting surface.
Figure 10:
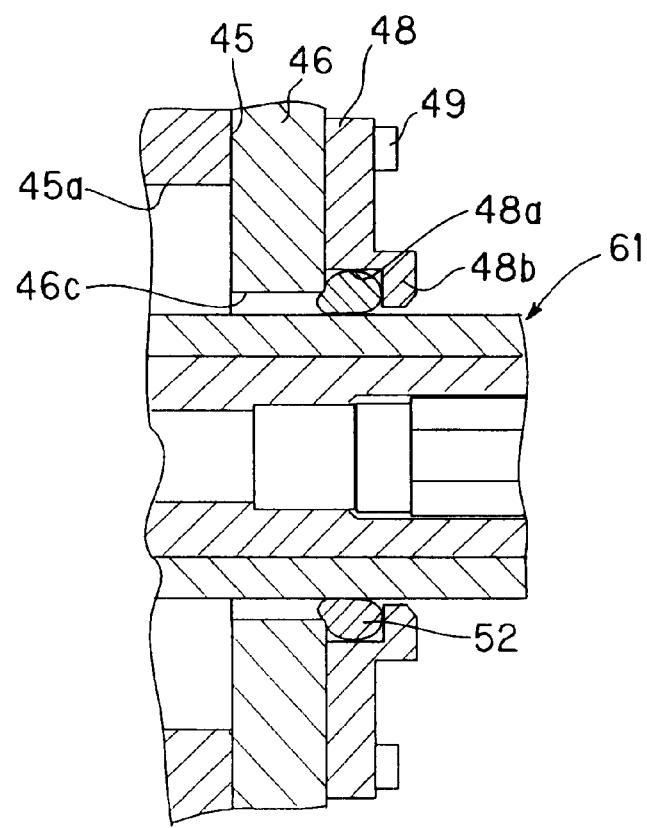
FIG. 10 is an enlarged view of a portion E in FIG. 5.
Figure 11:
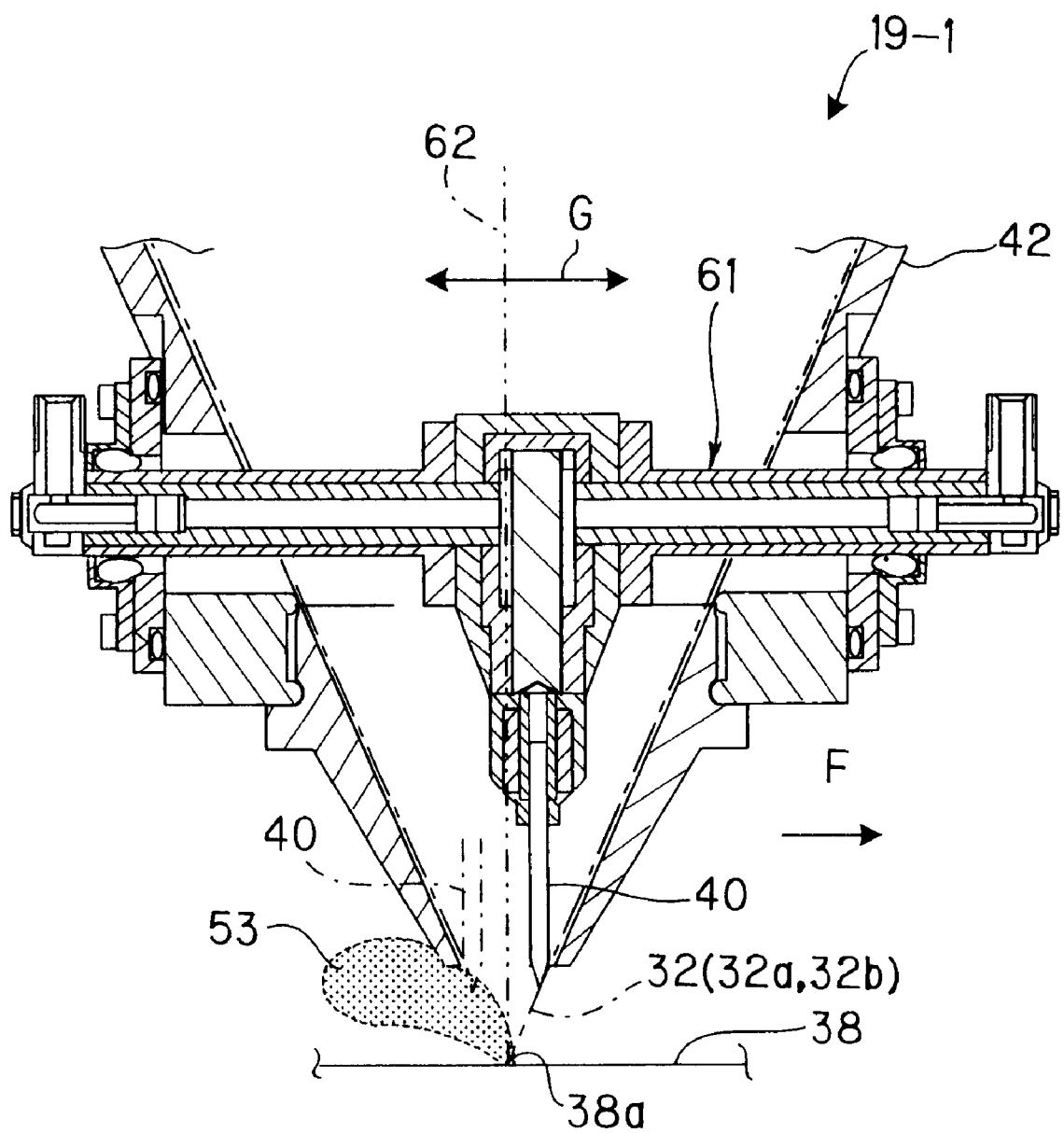
FIG. 11 is an explanation drawing showing a state of adjustment of arc electrode placement by an arc electrode adjusting mechanism provided in the laser/arc combined welding head.
Figure 12:
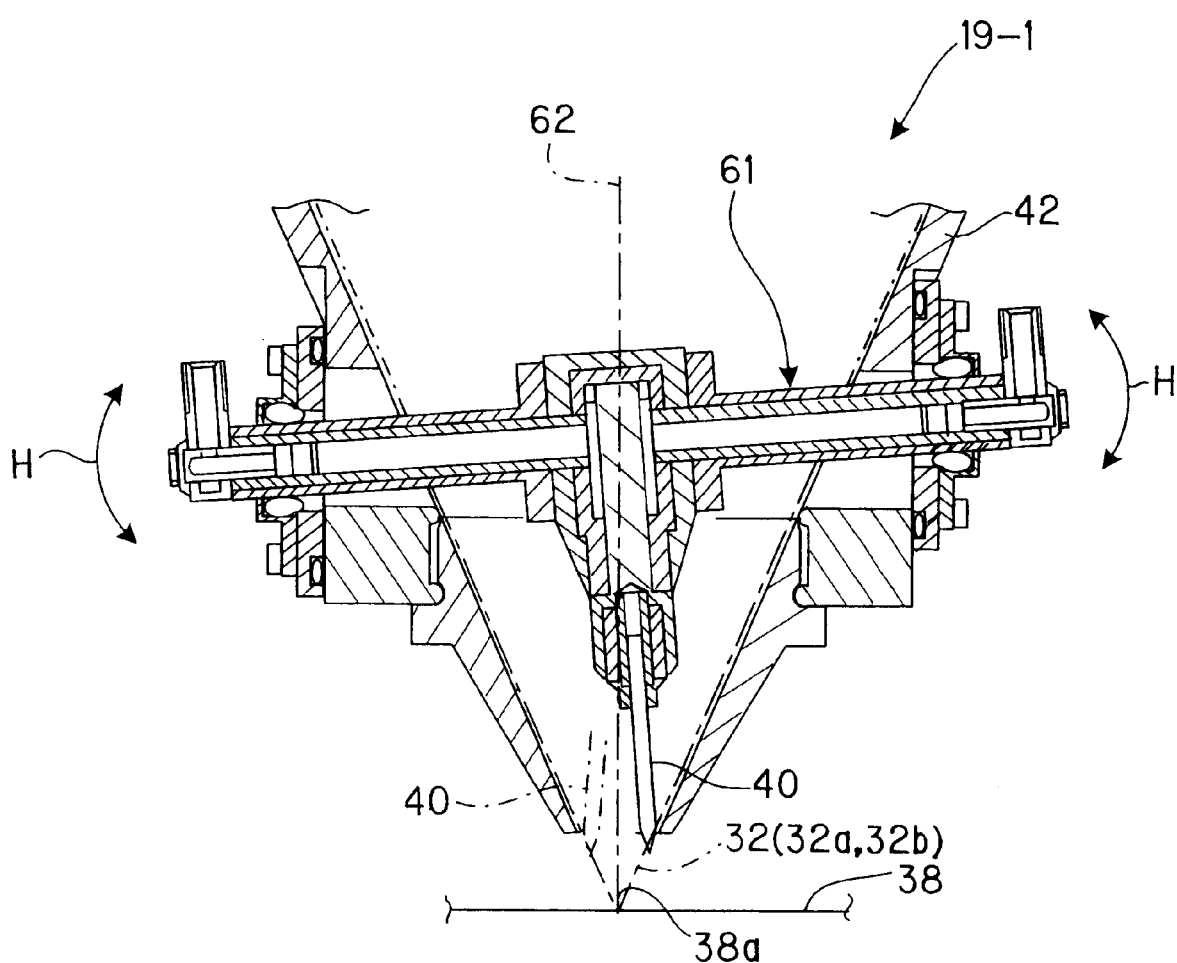
FIG. 12 is an explanation drawing showing a state of adjustment of arc electrode placement by an arc electrode adjusting mechanism provided in the laser/arc combined welding head.
Figure 13:
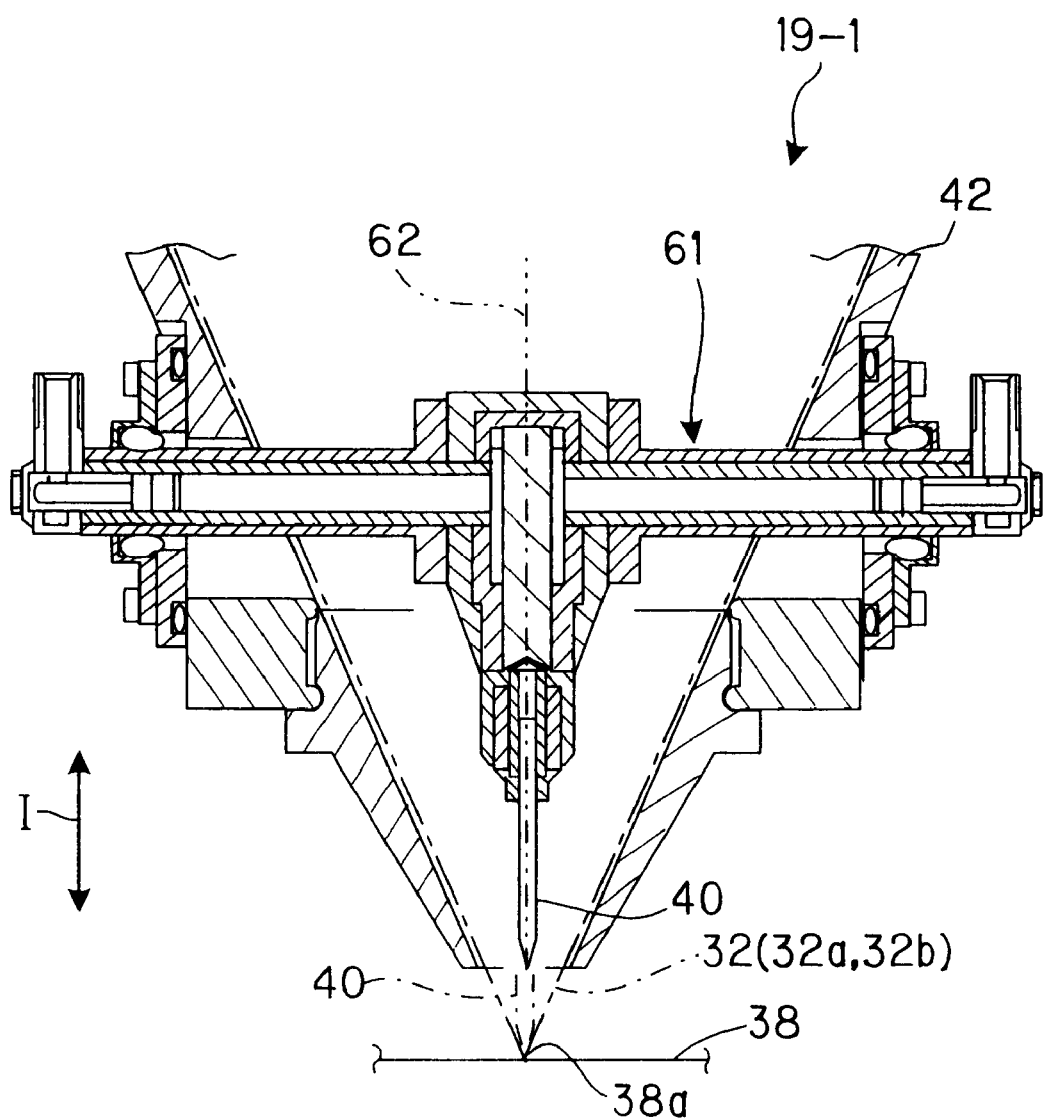
FIG. 13 is an explanation drawing showing a state of adjustment of arc electrode placement by an arc electrode adjusting mechanism provided in the laser/arc combined welding head.

FIG. 4 is a sectional view of a laser/arc combined welding head according to a first embodiment of the present invention. FIG. 5 is an enlarged sectional view taken on line A—A of FIG. 4. FIG. 6 is a view taken in the direction of B in FIG. 5. FIG. 7 is a sectional view taken on line C—C of FIG. 5. FIG. 8 is a partially cutaway view taken in the direction of D in FIG. 5. FIG. 9 is a structural view of a flange mounting surface (a view taken in the direction of B in FIG. 5). FIG. 10 is an enlarged view of a portion E in FIG. 5. FIGS. 11, 12 and 13 are explanation drawings showing the state of adjustment of arc electrode placement by an arc electrode adjusting mechanism provided in the laser/arc combined welding head.

Constitution

As shown in FIG. 4, a front end portion of an optical fiber 31 is connected to the top of a laser/arc combined welding head 19-1. A base end portion of the optical fiber 31 is connected to a YAG laser oscillator (not shown). Laser light 32 oscillated by the YAG laser oscillator is transmitted by the optical fiber 31, and introduced into the welding head 19-1.

The laser light 32 exiting from the front end of the optical fiber 31 is converted into a collimated beam by a collimating lens array 33 provided in the welding head 19-1. Then, a half of the collimated beam is reflected laterally by a plate-like first reflecting mirror 34 inclined at 45° relative to the direction of an optical axis of the laser light 32, and is further reflected downward by a plate-like second reflecting mirror 35 placed laterally of and opposed to the first reflecting mirror 34 with predetermined spacing therefrom. Thus, the laser light 32 of a circular cross section is divided into two beams of a semicircular cross section, a first divisional laser beam 32a and a second divisional laser beam 32b. A space portion 36 is formed between these divisional laser beams 32a and 32b.

The divisional laser beams 32a and 32b are focused by a focusing lens array 37 provided in the welding head 19-1, and applied to a material 38 to be welded, such as a steel plate. A rod-shaped arc electrode (arc rod) 40 comprising tungsten or the like is disposed in the space portion 36 between the divisional laser beams 32a and 32b, whereby the laser light 32 (divisional laser beams 32a, 32b) and the arc electrode 40 are coaxial.

This placement of the arc electrode 40 can be adjusted, as desired, by an arc electrode adjusting mechanism having all of an arc electrode position adjusting function, an arc electrode inclination angle adjusting function, and an arc electrode distance adjusting function.

A concrete configuration of this adjusting mechanism will be described in detail based on FIGS. 4 to 13.

As shown in FIG. 5, a nozzle 42 in the form of a truncated cone is attached to a lower portion of the welding head 19-1. During welding, an inert gas 51, such as an argon gas, is introduced into the nozzle 42 through a tube 44, and jetted toward a material 38 to be welded from an opening 42a at the front end (lower end) of the nozzle 42.

The arc electrode 40 is supported at the center of an arc electrode support member 61 of a cylindrical shape so as to face downward. The arc electrode as a whole is T-shaped. The arc electrode support member 61 comprises an electrically conductive member 41 of copper, and a ceramics tube 43 as an electrical insulator covering the outer periphery of the electrically conductive member 41, and penetrates through the nozzle 42 in a diametrical direction (right-and-left direction in FIG. 1).

An electric wire (not shown) is connected to the electrically conductive member 41, and a voltage is applied from a power source (not shown) to the arc electrode 40 via the electrically conductive member 41. A cooling water channel 61a is formed in the arc electrode support member 61, and cooling water is flowed in the cooling water channel 61a to cool the arc electrode 40.

As shown in FIGS. 5 to 10, flange mounting surfaces 45 are formed in opposite side portions of the nozzle 42, through which both ends of the arc electrode support member 61 penetrate, parallel to the direction of the optical axis (direction of irradiation: up-and-down direction in FIG. 5) of the laser light 32 (divisional laser beams 32a, 32b) to be applied to the material 38 to be welded. That is, the pair of flange mounting surfaces 45 are parallel to each other. An elongated hole 45a elongated in the direction of the optical axis is formed at the center of the flange mounting surface 45, and both ends of the arc electrode support member 61 are inserted through these elongated holes 45a. Thus, the arc electrode support member 61 is movable upward and downward by the length of the elongated hole 45a relative to the flange mounting surface 45.

A first flange 46 is fixed to the flange mounting surface 45. An O ring 50, a seal member, is sandwiched between the first flange 46 and the flange mounting surface 45. The O ring 50 is placed so as to surround the periphery of the elongated hole 45a of the flange mounting surface 45. Elongated holes 46a elongated in the direction of the optical axis are formed at four corners of the first flange 46, and the first flange 46 is fixed to the flange mounting surface 45 by screws 47 via these elongated holes 46a.

Thus, when the first flange 46 is fixed to the flange mounting surface 45 by the screws 47, leakage of the inert gas 51, flowing in the nozzle 42, from the gap between the flange mounting surface 45 and the first flange 46 is prevented by the O ring 50 pressed by the first flange 46 and the flange mounting surface 45. When the screws 47 are loosened, on the other hand, the first flange 46 can be moved upward and downward by the length of the elongated hole 46a relative to the flange mounting surface 45.

A circular hole 46c is formed at the center of the first flange 46, and both ends of the arc electrode support member 61 are inserted through these holes 46c. The inside diameter of the hole 46c is somewhat larger than the outside diameter of the arc electrode support member 61. That is, the inner periphery of the hole 46c is rendered greater than the outside periphery of the arc electrode support member 61 to form a suitable gap between the arc electrode support member 61 and the hole 46c, thereby making tilting of the arc electrode support member 61 (see FIG. 12) possible.

A second flange 48 is fixed to an outer surface 46b of the first flange 46 by screws 49. A circular hole 48a is formed at the center of the second flange 48, and both ends of the arc electrode support member 61 are inserted through the holes 48a. The hole 48a of the second flange 48 is somewhat larger than the hole 46c of the first flange 46.

As shown in FIG. 10 in an enlarged manner, an O ring 52 is placed along the inner peripheral surface of the hole 48a of the second flange 48 to surround the outer periphery of the arc electrode support member 61. In a portion outward of the hole 48a of the second flange 48, a protrusion 48b is formed which protrudes inwardly over the entire periphery of the hole 48a. Thus, when the screws 49 are tightened to fix the second flange 48 to the first flange 46, the O ring 52 is pressed out of shape by the protrusion 48b of the second flange 48. As a result, the gap between the arc electrode support member 61 and the second flange 46 is closed with the O ring 52. Thus, leakage of the inert gas 51 from this gap is prevented, and the arc electrode support member 61 is fixed by the reaction force of the O ring 52.

When the screws 49 are loosened, on the other hand, the pressure imposed on the O ring 52 by the protrusion 48b of the second flange 48 is reduced, whereby the pressurization of the arc electrode support member 61 by the O ring 52 is relaxed. Thus, the arc electrode support member 61 can be moved in the axial direction (the direction perpendicular to the direction of the optical axis).

The inner diameter of the protrusion 48b is somewhat greater than the outer diameter of the arc electrode support member 61. That is, the inner periphery of the protrusion 48b is rendered greater than the outer periphery of the arc electrode support member 61 to form a suitable gap between the arc electrode support member 61 and the protrusion 48b, thereby making inclination of the arc electrode support member 61 possible.

Actions/Effects

As stated above, the laser/arc combined welding head 19-1 of the present embodiment has, as the arc electrode adjusting mechanism, the mechanism having all of the arc electrode position adjusting function, the arc electrode inclination angle adjusting function, and the arc electrode distance adjusting function.

That is, the arc electrode adjusting mechanism is composed of the pair of flange mounting surfaces 45 formed parallel on both sides of the nozzle 42 of the welding head 19-1, and having elongated holes 45a elongated in the direction of the optical axis of the laser light 32 (divisional laser beams 32a, 32b) to be applied to the material 38 to be welded, the opposite ends of the arc electrode support member 61 being inserted through the elongated holes 45a, the first flanges 46 each having the elongated holes 46a elongated in the direction of the optical axis, being fixed to the flange mounting surface 45 by the screws 47 via the elongated holes 46a, and having the hole 46c of such a size that the arc electrode support member 61 is tiltable, the opposite ends of the arc electrode support member 61 being inserted through the holes 46c, the O rings 50 each interposed between the flange mounting surface 45 and the first flange 46, and surrounding the periphery of the elongated hole 45a of the flange mounting surface 45, the second flanges 48 each fixed to the outer surface 46c of the first flange 46 by the screws 49, having the hole 48a larger than the hole 46c of the first flange 46 for insertion of the opposite ends of the arc electrode support member 61, and having the protrusion 48b in the portion outside the hole 48a, the protrusion 48b protruding inward over the entire periphery of the hole 48a, having the inner periphery larger than the outer periphery of the arc electrode support member 61, and allowing the arc electrode support member 61 to tilt, and the O rings 52 each disposed along the inner peripheral surface of the hole 48a of the second flange 48 to surround the outer periphery of the arc electrode support member 61, and squeezed by the protrusion 48b of the second flange 48 when the screws 49 are tightened to fix the second flange 48 to the first flange 46, thereby closing the gap between the arc electrode support member 61 and the second flange 48, and fixing the arc electrode support member 61 by a reaction force.

According to this arc electrode adjusting mechanism, therefore, as shown in FIG. 11, the arc electrode 40 is moved in a direction (the direction of an arrow G) perpendicular to the direction 62 of the optical axis of the laser light 32 (divisional laser beams 32a, 32b) applied to the material 38 to be welded, whereby the position of the arc electrode 40 in the perpendicular direction relative to the position 38a of application of the laser light 32 (divisional laser beams 32a, 32b) can be adjusted.

Concretely, the screws 49 are loosened to reduce the pressure imposed on the O ring 52 by the protrusion 48b of the second flange 48. Thus, the arc electrode support member 61 is moved in the direction perpendicular to the direction 62 of the optical axis, as shown by the double headed arrow G, to move the arc electrode 40 in the same direction. By this measure, the above-mentioned position of the arc electrode 40 in the perpendicular direction relative to the position 38a of laser light application can be adjusted as desired. When the screws 49 are tightened again, leakage of the inert gas 51 from the gap between the arc electrode support member 61 and the second flange 48 can be prevented reliably by the O ring 52, and the arc electrode support member 61 can also be fixed thereby.

As shown in FIG. 12, moreover, the arc electrode 40 is inclined relative to the position 38a of laser light application, whereby the inclination angle of the arc electrode 40 relative to the position 38a of laser light application can be adjusted.

Concretely, the screws 47 are loosened, whereby it becomes possible to move the first flange 46 in the direction 62 of the optical axis. Thus, one of the first flanges 46 is moved upward, while the other first flange 46 is moved downward. Alternatively, only one of the first flanges 46 is moved upward or downward. This makes it possible to adjust, as desired, the inclination angle of the arc electrode 40 relative to the position 38a of laser light application. When the screws 47 are retightened, leakage of the inert gas 51 from the gap between the flange mounting surface 45 and the first flange 46 can be prevented reliably by the O ring 50.

As shown in FIG. 13, moreover, the arc electrode 40 is brought close to or away from the position 38a of laser light application, whereby the distance between the position 38a of laser light application and the arc electrode 40 can be adjusted.

Concretely, the screws 47 are loosened, whereby it becomes possible to move the first flange 46 in the direction 62 of the optical axis, as described above. Thus, both of the first flanges 46 are moved upward or downward, thereby making it possible to adjust, as desired, the distance between the position 38a of laser light application and the arc electrode 40.

According to the laser/arc combined welding head 19-1 of the present embodiment, meticulous adjustment for placement of the arc electrode 40 can be made by the arc electrode adjusting mechanism, thus making it possible to select optimal placement conditions under which the arc discharge to the material 38 to be welded can be performed reliably, and deposition of a metal vapor 53 on the tip of the arc electrode (see FIG. 11) can be prevented.

Second Embodiment

Figure 14:
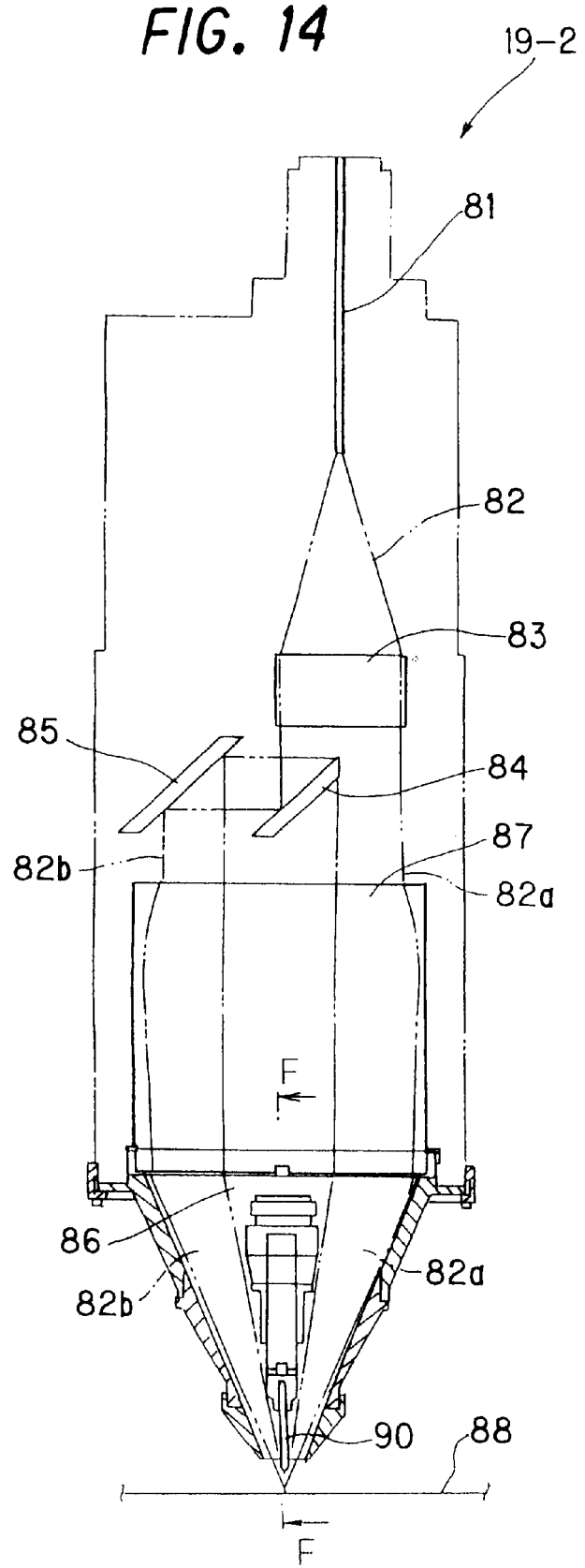
FIG. 14 is a sectional view of a laser/arc combined welding head according to a second embodiment of the present invention.
Figure 15:
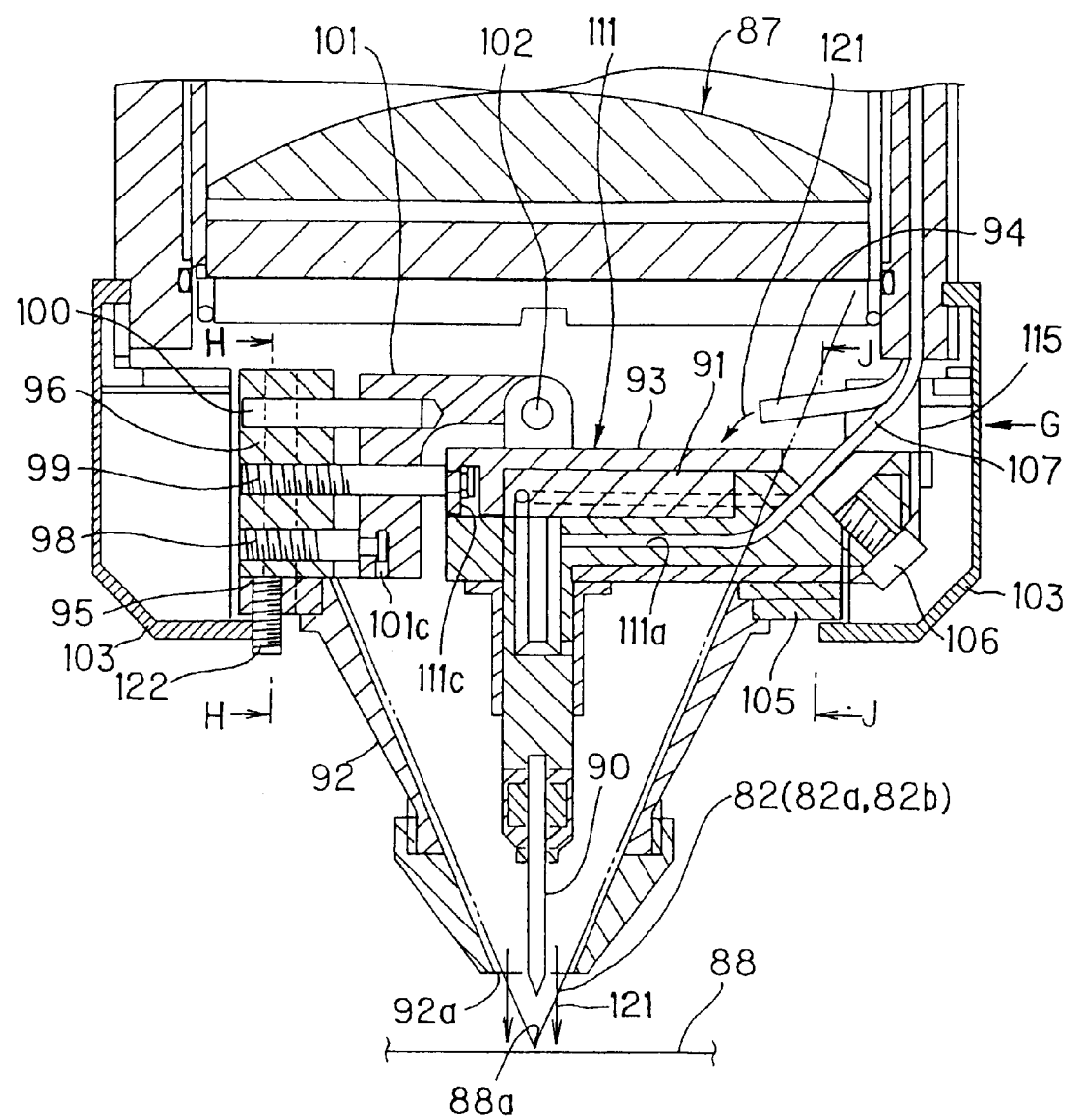
FIG. 15 is an enlarged sectional view taken on line F—F of FIG. 14.
Figure 16:
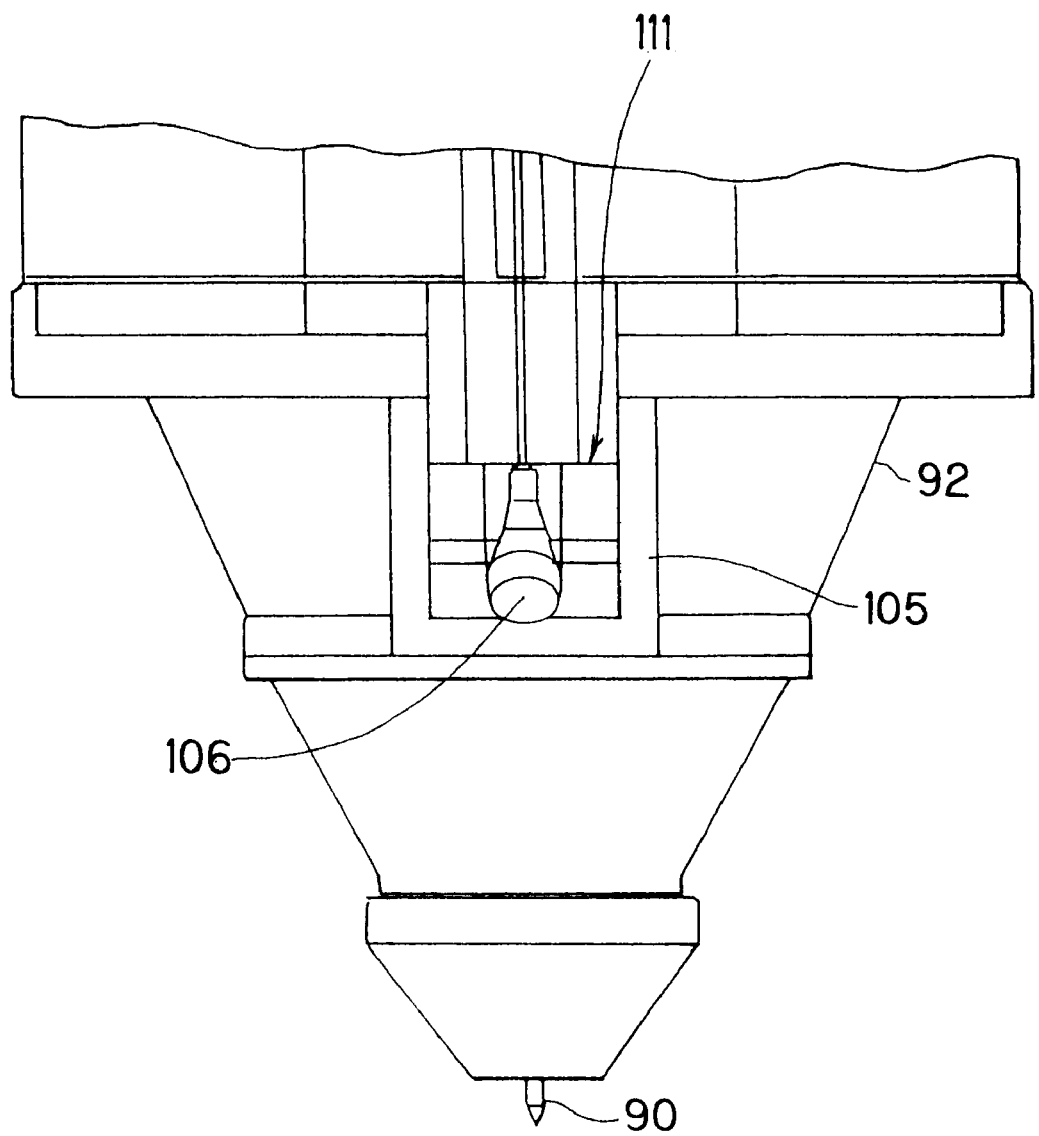
FIG. 16 is a view taken in the direction of G in FIG. 15.
Figure 19:
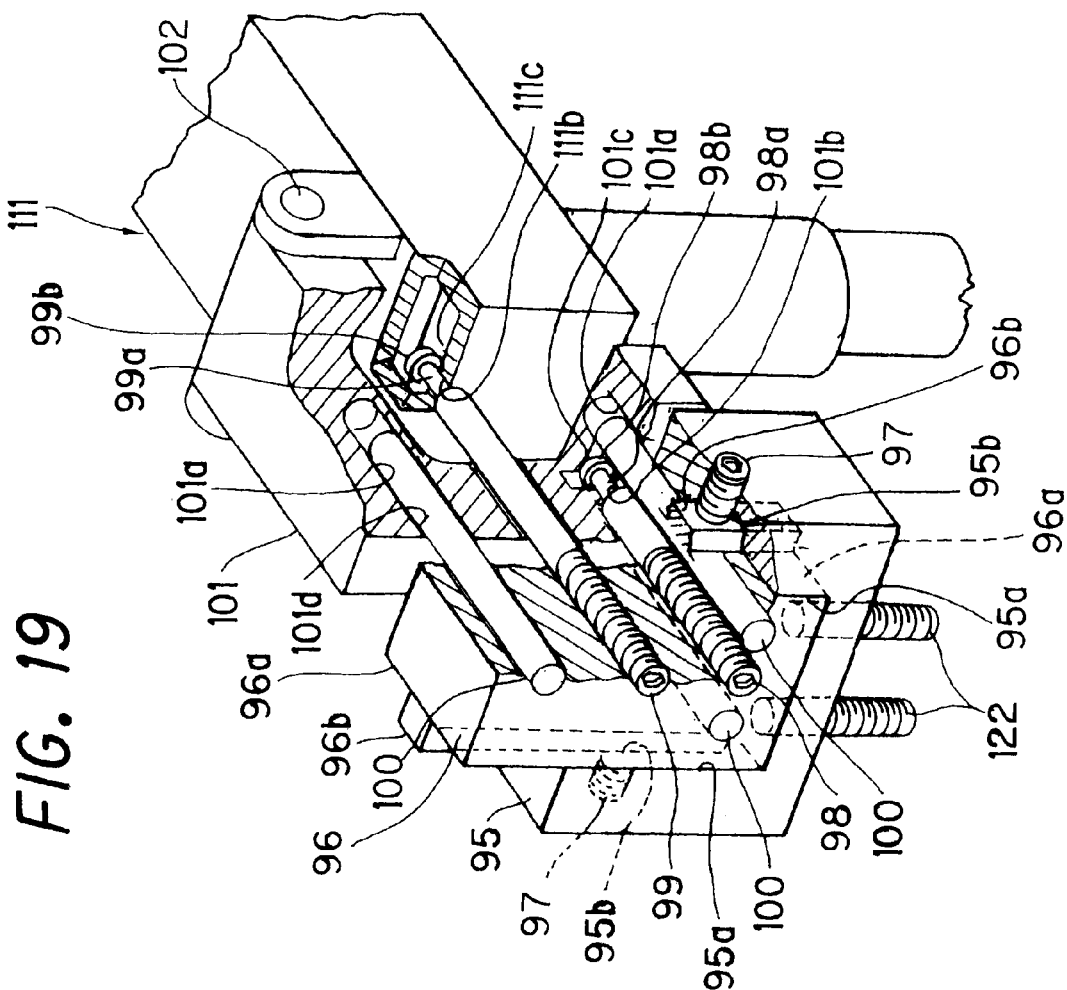
FIG. 19 is an enlarged perspective view, extracted and partially cutaway, of the arc electrode adjusting mechanism provided in the laser/arc combined welding head.
Figure 20:
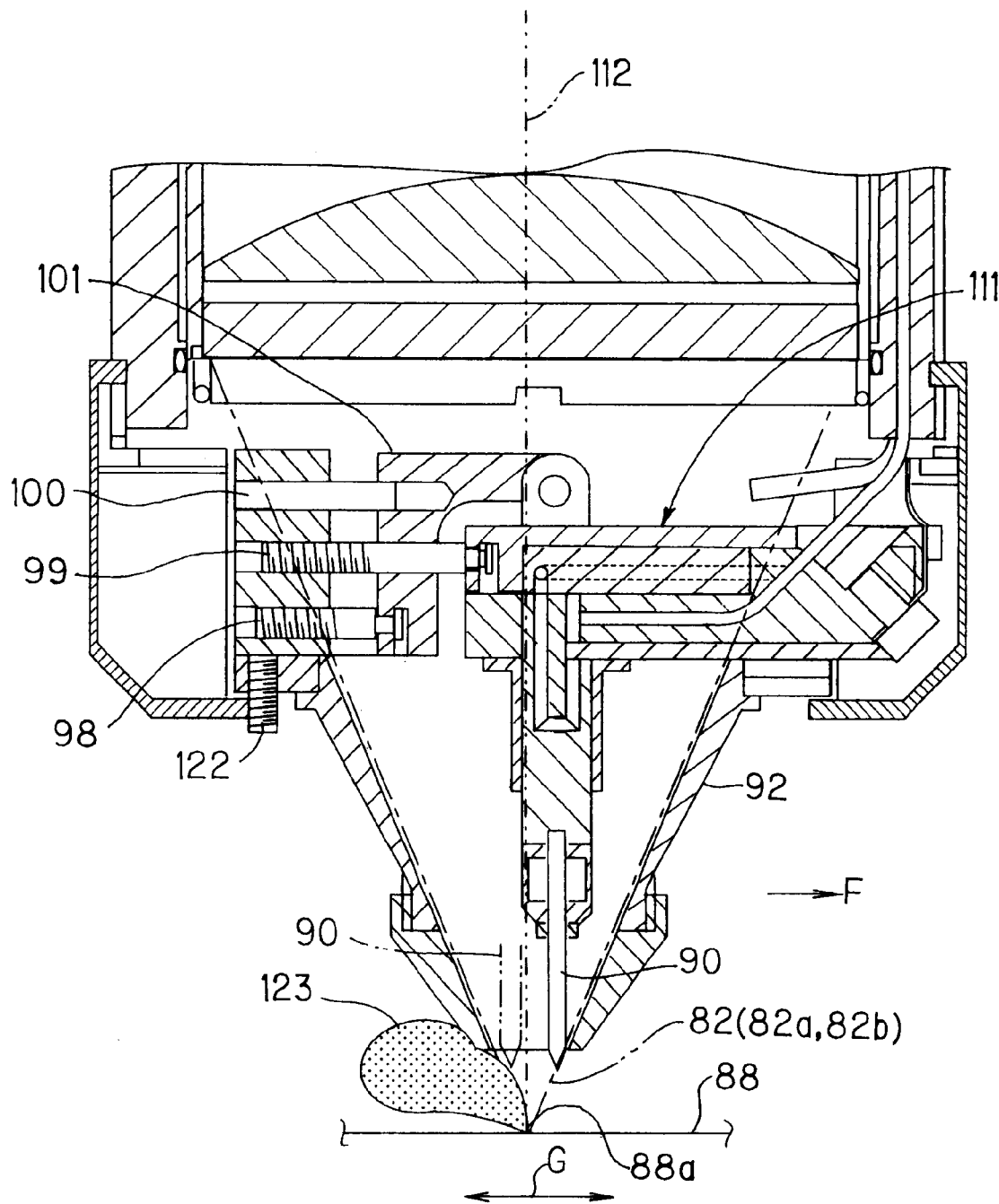
FIG. 20 is an explanation drawing showing a state of adjustment of arc electrode placement by the arc electrode adjusting mechanism.
Figure 21:
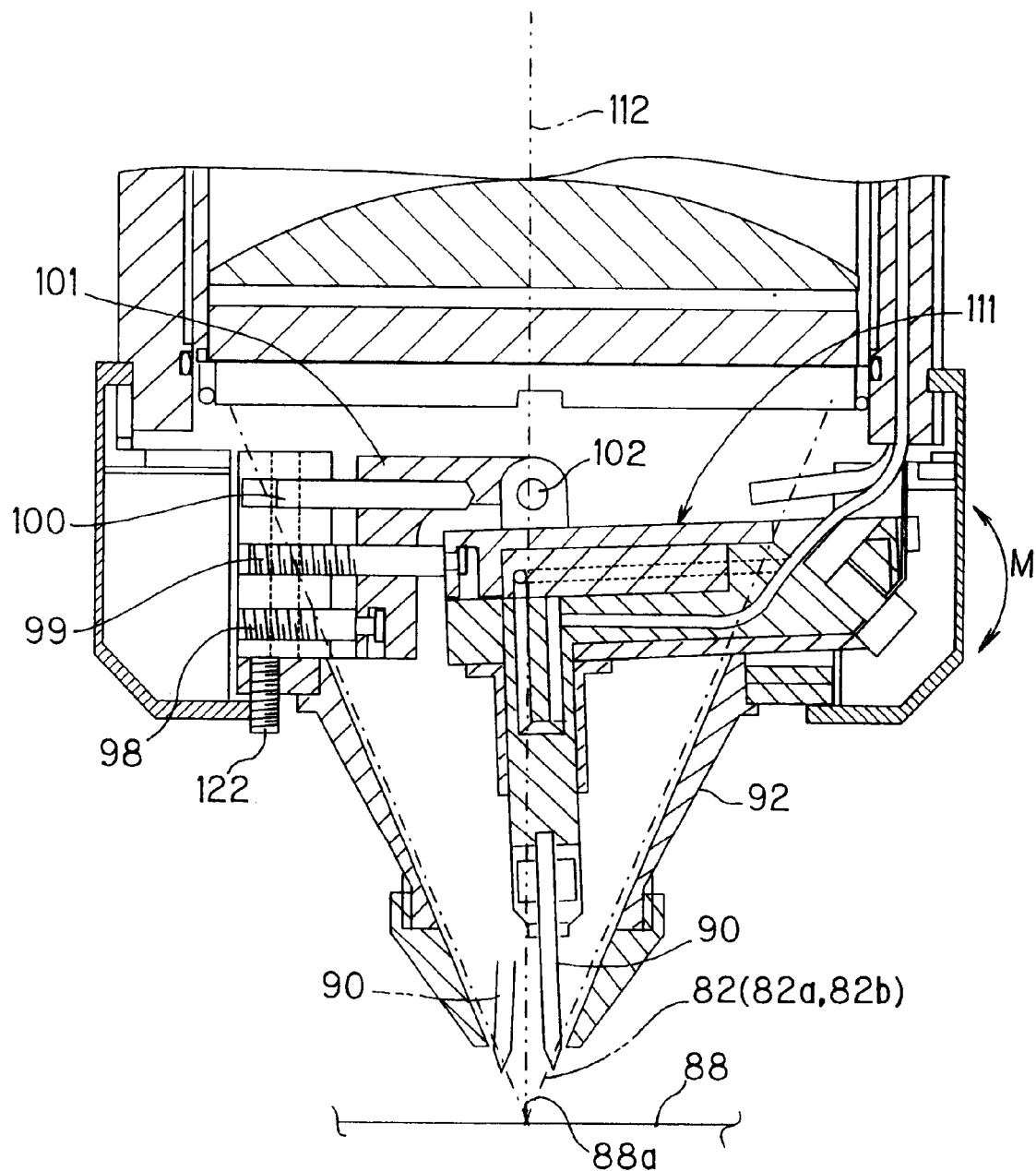
FIG. 21 is an explanation drawing showing a state of adjustment of arc electrode placement by the arc electrode adjusting mechanism.
Figure 22:
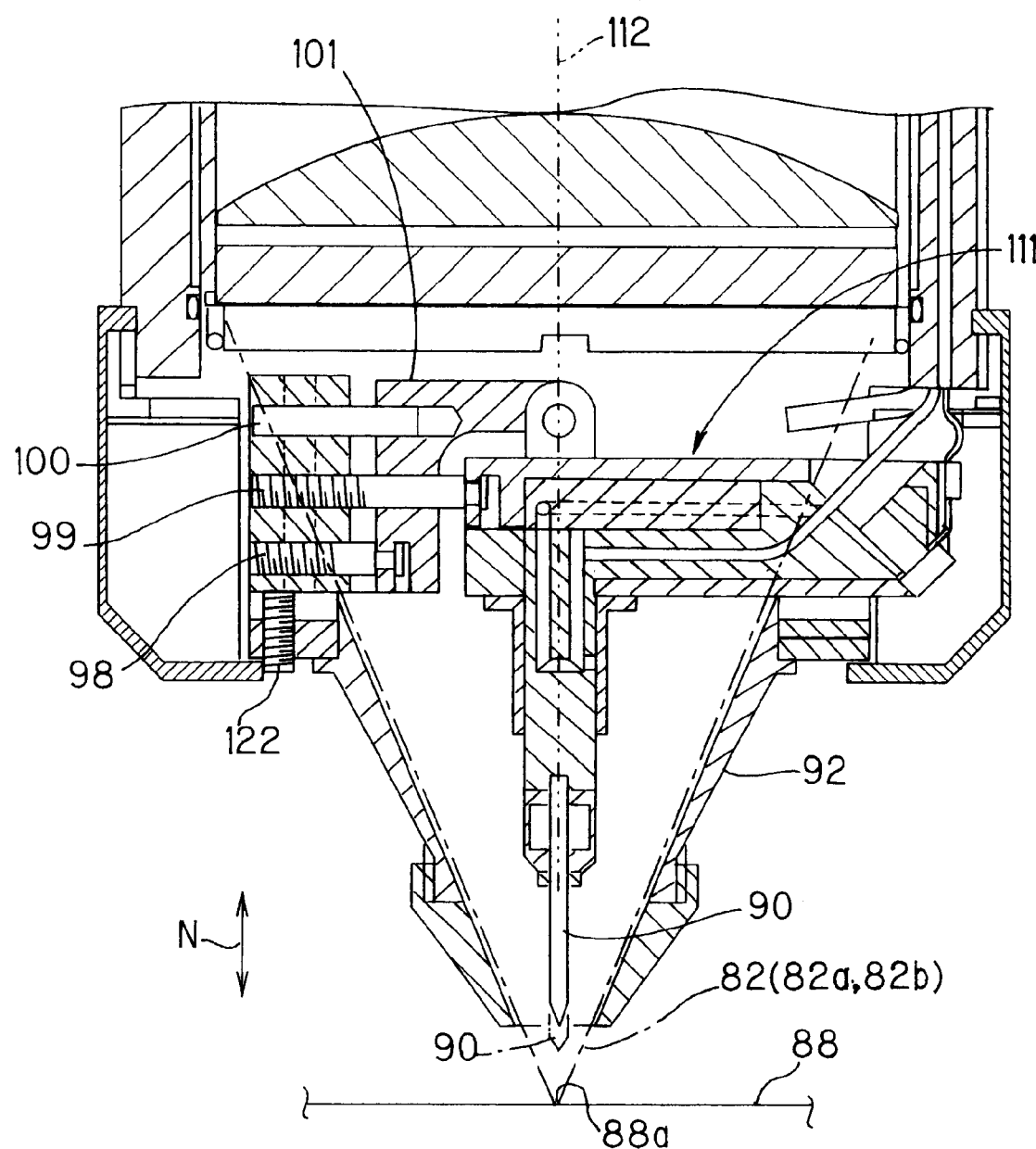
FIG. 22 is an explanation drawing showing a state of adjustment of arc electrode placement by the arc electrode adjusting mechanism.

FIG. 14 is a sectional view of a laser/arc combined welding head according to a second embodiment of the present invention. FIG. 15 is an enlarged sectional view taken on line F—F of FIG. 14. FIG. 16 is a view taken in the direction of G in FIG. 15 (a state in which a rubber cover has been detached). FIG. 17(a) is a sectional view taken on line H—H of FIG. 15. FIG. 17(b) is a sectional view taken on line I—I of FIG. 17(a). FIG. 18(a) is a sectional view taken on line J—J of FIG. 15. FIG. 18(b) is a partially cutaway view taken in the direction of K in FIG. 18(a). FIG. 19 is an enlarged perspective view, extracted and partially cutaway, of an arc electrode adjusting mechanism provided in the laser/arc combined welding head. FIGS. 20, 21 and 22 are explanation drawings showing the states of adjustment of arc electrode placement by the arc electrode adjusting mechanism.

Constitution

As shown in FIG. 14, a front end portion of an optical fiber 81 is connected to the top of a laser/arc combined welding head 19-2. A base end portion of the optical fiber 81 is connected to a YAG laser oscillator (not shown). Laser light 82 oscillated by the YAG laser oscillator is transmitted by the optical fiber 81, and introduced into the welding head 19-2.

The laser light 82 exiting from the front end of the optical fiber 81 is converted into a collimated beam by a collimating lens array 83 provided in the welding head 19-2. Then, a half of the collimated beam is reflected laterally by a plate-like first reflecting mirror 84 inclined at 45° relative to the direction of an optical axis of the laser light 82, and is further reflected downward by a plate-like second reflecting mirror 85 placed laterally of and opposed to the first reflecting mirror 84 with predetermined spacing therefrom. Thus, the laser light 82 of a circular cross section is divided into two beams of a semicircular cross section, a first divisional laser beam 82a and a second divisional laser beam 82b. A space portion 86 is formed between these divisional laser beams 82a and 82b.

The divisional laser beams 82a and 82b are focused by a focusing lens array 87 provided in the welding head 19-2, and applied to a material 88 to be welded, such as a steel plate. A rod-shaped arc electrode (arc rod) 90 comprising tungsten or the like is disposed in the space portion 86 between the divisional laser beams 82a and 82b, whereby the laser light 82 (divisional laser beams 82a, 82b) and the arc electrode 90 are coaxial.

This placement of the arc electrode 90 can be adjusted, as desired, by an arc electrode adjusting mechanism having all of an arc electrode position adjusting function, an arc electrode inclination angle adjusting function, and an arc electrode distance adjusting function.

A concrete configuration of this adjusting mechanism will be described in detail based on FIGS. 14 to 22.

As shown in FIG. 15, a nozzle 92 in the form of a truncated cone is attached to a lower portion of the welding head 19-2. During welding, an inert gas 121, such as an argon gas, is introduced into the nozzle 92 through a tube 94, and jetted toward a material 88 to be welded from an opening 92a at the front end (lower end) of the nozzle 92. The arc electrode 90 is supported at the end of an arc electrode support member 111 in the form of a quadrilateral prism so as to face downward. The arc electrode as a whole is L-shaped. The arc electrode support member 111 comprises an electrically conductive member 91 of copper, and a ceramics tube 93 as an electrical insulator covering the outer periphery of the electrically conductive member 91, and is located in the nozzle 92 along a diametrical direction (right-and-left direction in FIG. 15).

An electric wire 115 is connected to the electrically conductive member 91 by a screw 106, and a voltage is applied from a power source (not shown) to the arc electrode 90 via the electrically conductive member 91. A cooling water channel 111a is formed in the arc electrode support member 111, and cooling water is flowed in the cooling water channel 111a to cool the arc electrode 90.

As shown in FIGS. 15, 17 and 19, a first vertical slide guide 95 of a ⊐-shape is fixed to a side portion of the nozzle 92. Grooves 95b, which extend in the direction of the optical axis (direction of irradiation: up-and-down direction in FIG. 17) of the laser light 82 (divisional laser beams 82a, 82b) to be applied to the material 88 to be welded, are formed in the inner surface 95a of the first vertical slide guide 95. A second vertical slide guide 96, on the other hand, is of a rectangular parallelepiped, and protrusions 96b extending in the direction of the optical axis are formed in side surfaces 96a thereof. The grooves 95b of the first vertical slide guide 95, and the protrusions 96b of the second vertical slide guide 96 are fitted slidably in the direction of the optical axis. That is, the second vertical slide guide 96 is guided by the grooves 95a of the first vertical slide guide 95, and moved in the direction of the optical axis.

Two vertical feed screws 122 with a hexagonal socket are screwed to a lower portion of the first vertical slide guide 95, and these vertical feed screws 122 are in contact, at their front end (upper end), with a bottom surface of the second vertical slide guide 96. Thus, when the vertical feed screws 122 are turned in one direction, the second vertical slide guide 96 is pushed upward by the vertical feed screws 122. When the vertical feed screws 122 are turned in the other direction, the second vertical slide guide 96 can be lowered. That is, the vertical position of the second vertical slide guide 96 (the vertical position of the arc electrode 90) can be adjusted by the vertical feed screws 122.

Fixing screws 97 are screwed to the first vertical slide guide 95, and when these fixing screws 97 are tightened, the front end of each fixing screw 97 contacts the side surface 96a (protrusion 96b) of the second vertical slide guide 96, whereby the second vertical slide guide 96 can be fixed. That is, the set second vertical slide guide 96 (arc electrode 90) can be reliably fixed by the fixing screws 97 at the position adjusted by the vertical feed screws 122.

A cross feed screw 98 and a swing feed screw 99, each having a hexagonal socket, are screwed to the second vertical slide guide 96 along the diametrical direction of the nozzle 92, and three lateral slide guide shafts 100 are also fixed to the second vertical slide guide 96. The lateral slide guide shafts 100 are slidably inserted into three holes 101a formed in an L-shaped support member 101.

The cross feed screw 98 has a thin front end portion 98a, and a head 98b is formed at the tip of the front end portion 98a. The front end portion 98a of the cross feed screw 98 is rotatably inserted into a hole 101b of the support member 101. The head 98b of the cross feed screw 98 is rotatably placed in other hole 101c formed at the tip of the hole 101b in the support member 101, so that the cross feed screw 98 does not escape from the hole 101b even when moved in the axial direction. That is, in the cross feed screw 98, the front end portion 98 having the head 98a is rotatably joined to the support member 101.

Thus, when the cross feed screw 98 is turned, the support member 101 is pushed or pulled by the cross feed screw 98, whereby the support member 101 is guided by the lateral slide guide shaft 100 and moved in the direction perpendicular to the direction of the optical axis. That is, the lateral position of the support member 101 (the lateral position of the arc electrode 90) can be adjusted by the cross feed screw 98. On this occasion, the swing feed screw 99 also needs to be simultaneously turned so that the cross feed by the cross feed screw 98 will not be hindered (see FIG. 20).

An inside end portion of the support member 101 (a right end portion in FIG. 15), and an inside end portion of the arc electrode support member 111 (a left end portion in FIG. 15) have a hinge structure with which they are pivotably connected via a swing pin (pivot shaft) 102. The swing feed screw 99 is slidably inserted through the hole 101d of the support member 101. The swing feed screw 99 is also thin at its front and portion 99a, and a head 99b is formed at the tip of the front end portion 99a.

The front end portion 99a of the swing feed screw 99 is inserted into a hole 111b of the arc electrode support member 111, and a gap which allows the arc electrode 90 to incline by a predetermined angle is provided between the front end portion 99a and the arc electrode support member 111. The head 99b of the swing feed screw 99 is located in other hole 111c formed ahead of the hole 111b in the arc electrode support member 111. Between the head 99b and the arc electrode support member 111, there is a gap which allows the arc electrode 90 to tilt by a predetermined angle. Even when the swing feed screw 99 is moved in the axial direction, the head 99b does not escape from the hole 111b. That is, in the swing feed screw 99, the front end portion 99a having the head 99b is joined to the arc electrode support member 101 rotatably and pivotably.

Thus, when the swing feed screw 99 is turned, the arc electrode support member 111 is pushed or pulled by the swing feed screw 99, whereby the arc electrode support member 111 pivots about the swing pin 102 and inclines. That is, the inclination angle of the arc electrode support member 111 (inclination angle of the arc electrode 60) can be adjusted by the swing feed screw 99.

As shown in FIG. 15, the first vertical slide guide 95 and the second vertical slide guide 96 are covered with a rubber cover 103 detachably provided on the nozzle 92. This rubber cover 103 prevents the inert gas 121 flowing in the nozzle 92 from leaking to the outside.

As shown in FIGS. 15, 16 and 18, an outside end portion (a right end portion in FIG. 15) of the arc electrode support member 111 is fitted into a ⊐-shaped guide member 105 fixed to the side portion of the nozzle 92, and thus becomes slidable in the direction of the optical axis. The outside end portion of the arc electrode support member 111 is also covered with the rubber cover 103.

Actions/Effects

As stated above, the laser/arc combined welding head 19-2 according to the present embodiment has, as the arc electrode adjusting mechanism, the mechanism having all of the arc electrode position adjusting function, the arc electrode inclination angle adjusting function, and the arc electrode distance adjusting function.

That is, the arc electrode adjusting mechanism is composed of
the support member 101 pivotably supporting the arc electrode support member 111,
the first vertical slide guide 95 fixed to the side portion of the nozzle 92 of the welding head 19-2,
the second vertical slide guide 96 guided by the first vertical slide guide 95 in the direction of the optical axis of the laser light 82 (divisional laser beams 82a, 82b) applied to the material 88 to be welded,
the cross feed screw 98 screwed to the first vertical slide guide 95, and having the front end portion 95a rotatably joined to the support member 101 to move the arc electrode 90 in the direction perpendicular to the direction of the optical axis together with the support member 101 and the arc electrode support member 111,
the swing feed screw 99 screwed to the first vertical slide guide 95, and having the front end portion 96a rotatably and pivotably joined to the arc electrode support member 111 to pivot the arc electrode 90 together with the arc electrode support member 111, and
the vertical feed screws 122 screwed to the first vertical slide guide 95, and having the front end in contact with the bottom surface of the second vertical slide guide 96 to move the arc electrode 90 in the direction of the optical axis together with the second vertical slide guide 96, the support member 101 and the arc electrode support member 111.

According to this arc electrode adjusting mechanism, therefore, as shown in FIG. 20, the arc electrode 90 is moved in the direction (the direction of the arrow G) perpendicular to the direction 112 of the optical axis of the laser light 82 (divisional laser beams 82a, 82b) applied to the material 58 to be welded, whereby the position of the arc electrode 90 in the perpendicular direction relative to the position 88a of application of the laser light 82 (divisional laser beams 82a, 82b) can be adjusted. Concretely, the cross feed screw 98 is turned to move the arc electrode 90, together with the support member 101 and the arc electrode support member 111, in the direction perpendicular to the direction 112 of the optical axis, as indicated by the arrow G, so that the position of the arc electrode 90 in the perpendicular direction can be adjusted as desired.

As shown in FIG. 21, moreover, the arc electrode 90 is inclined relative to the position 88a of laser light application, whereby the inclination angle of the arc electrode 90 relative to the position 88a of laser light application can be adjusted. Concretely, when the swing feed screw 99 is turned, the arc electrode 90 pivots, as indicated by an arrow M, together with the arc electrode support member 111, so that the inclination angle of the arc electrode 90 can be adjusted as desired.

As shown in FIG. 22, moreover, the arc electrode 90 is brought close to or away from the position 88a of laser light application, whereby the distance between the position 88a of laser light application and the arc electrode 90 can be adjusted. Concretely, the vertical feed screws 122 are turned, whereby it becomes possible to move the arc electrode 90, together with the second vertical slide guide 96, support member 101 and arc electrode support member 111, in the direction 112 of the optical axis, as indicated by an arrow N. Thus, the distance between the position 88a of laser light application and the arc electrode 90 can be adjusted as desired.

According to the laser/arc combined welding head 19-2 of the present embodiment, as described above, meticulous adjustment for placement of the arc electrode 90 can be made by the arc electrode adjusting mechanism, thus making it possible to select optimal placement conditions under which the arc discharge to the material 88 to be welded can be performed reliably, and deposition of a metal vapor 123 on the tip of the arc electrode (see FIG. 20) can be prevented.

Third Embodiment

Figure 23:
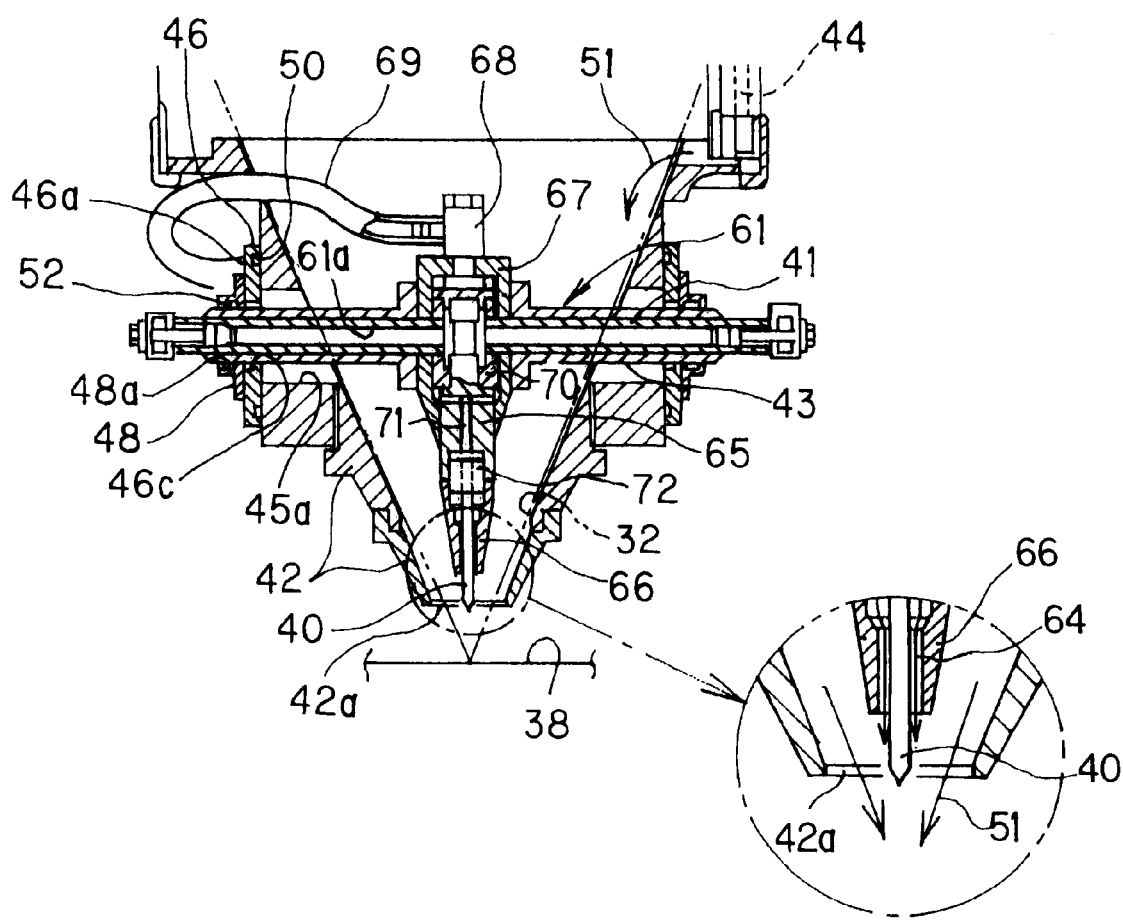
FIG. 23 is a sectional view of an essential part of a laser/arc combined welding head according to a third embodiment of the present invention.

FIG. 23 is a sectional view of an essential part of a laser/arc combined welding head according to a third embodiment of the present invention.

Constitution

The present embodiment, as shown in FIG. 23, is intended to equip the arc electrode support member 61 in the aforementioned First Embodiment with gas flow generating means to generate and eject a gas flow 64 along the axis of the arc electrode 40 by the gas flow generating means.

That is, the gas flow generating means is constituted in the following manner: The upper end of an auxiliary nozzle 66 fitted over the arc electrode 40 with a predetermined circumferential gap is connected to the lower end of a collet holder 65 of an arc electrode support member 61. An inert gas, such as an argon gas, is introduced from a gas supply source (not shown) into the inside of an insulating cover 67 of the arc electrode support member 61 via a universal elbow 68 and a hose 69.

The inert gas introduced within the insulating cover 67 passes through a groove passage (not shown) between the inner peripheral surface of the insulating cover 67 and the outer peripheral surface of a cooling block 70, and flows through a gas passage 71 formed within the collet holder 65. From there, the inert gas passes through a groove passage (not shown) formed in the outer peripheral surface of a collet chuck 72, arriving at the interior of the auxiliary nozzle 66. Then, the inert gas passes through the circumferential gap between the auxiliary nozzle 66 and the arc electrode 40, and gushes out as the above-mentioned gas flow 64.

Actions/Effects

According to the present embodiment, in addition to the optimal placement of the arc electrode 40 by the arc electrode adjusting mechanism explained in the First Embodiment, the gas flow 64 along the axis of the arc electrode 40 is generated and ejected from the auxiliary nozzle 66 at a predetermined flow velocity (a flow velocity made higher than that of an inert gas 51 by the setting of the diameter of the passage, but not adversely affecting the weld bead), aside from the inert gas 51 introduced from a tube 44 and ejected from a vertically divisible nozzle 42. Thus, a metal vapor from the material 38 being welded, which has occurred upon irradiation with laser light 32, is positively scavenged from around the axis of the arc electrode 40, so that deposition of the metal vapor on the arc electrode 40 is prevented further.

Consequently, the arc electrode 40 can be brought as close as possible to the laser light application position of the material 38 to be welded. Thus, an increase in the efficiency of arc welding can be achieved, and the effect of the laser/arc combined welding head can be exhibited maximally.

Fourth Embodiment

Figure 24:
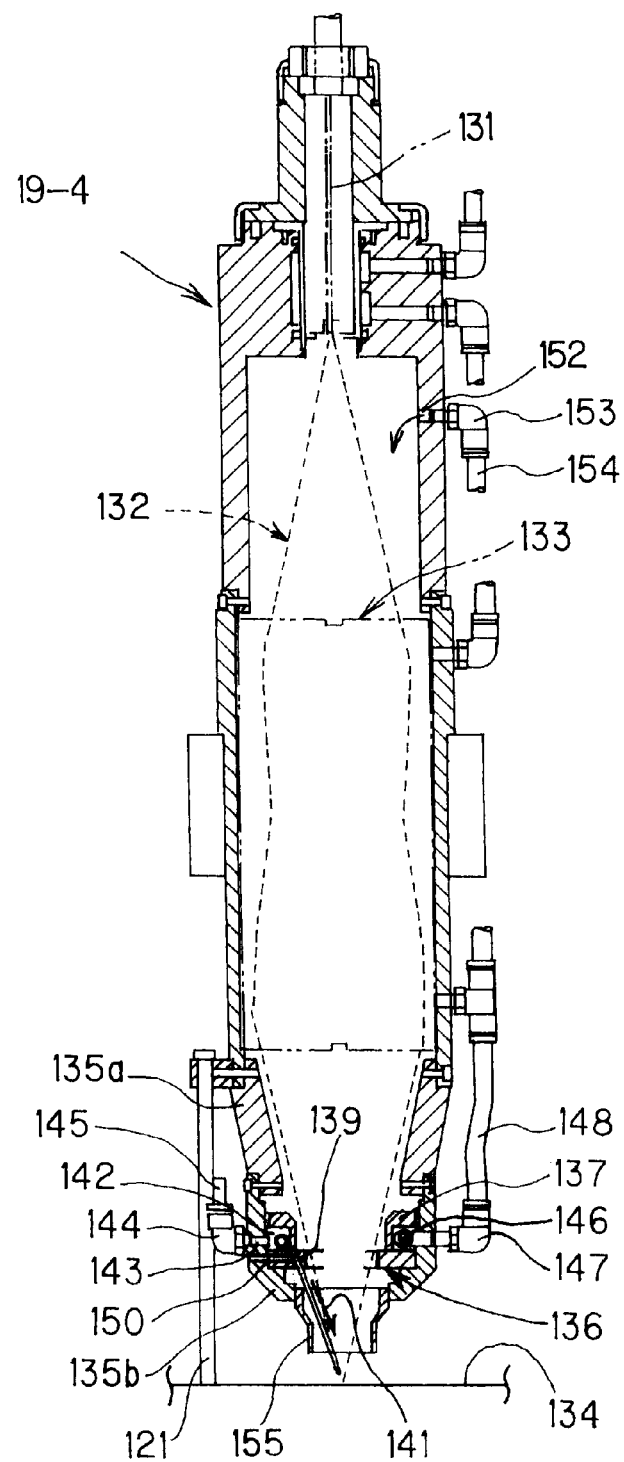
FIG. 24 is a sectional view of a laser/arc combined welding head according to a fourth embodiment of the present invention.
Figure 25:
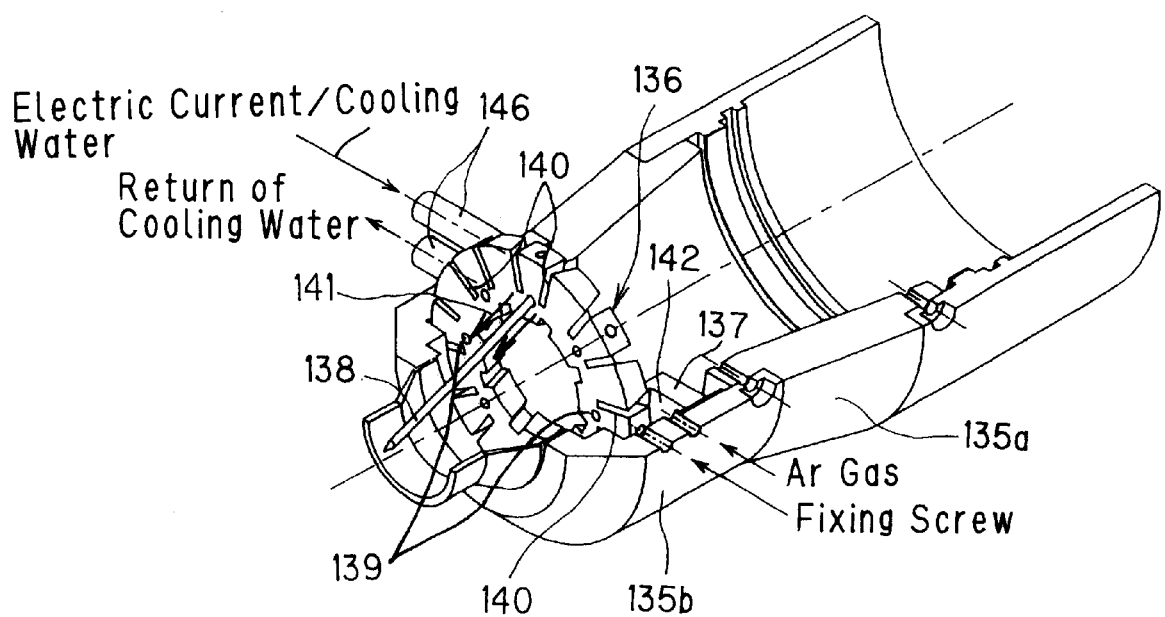
FIG. 25 is a cutaway perspective view of an essential part of the laser/arc combined welding head.
Figure 26:
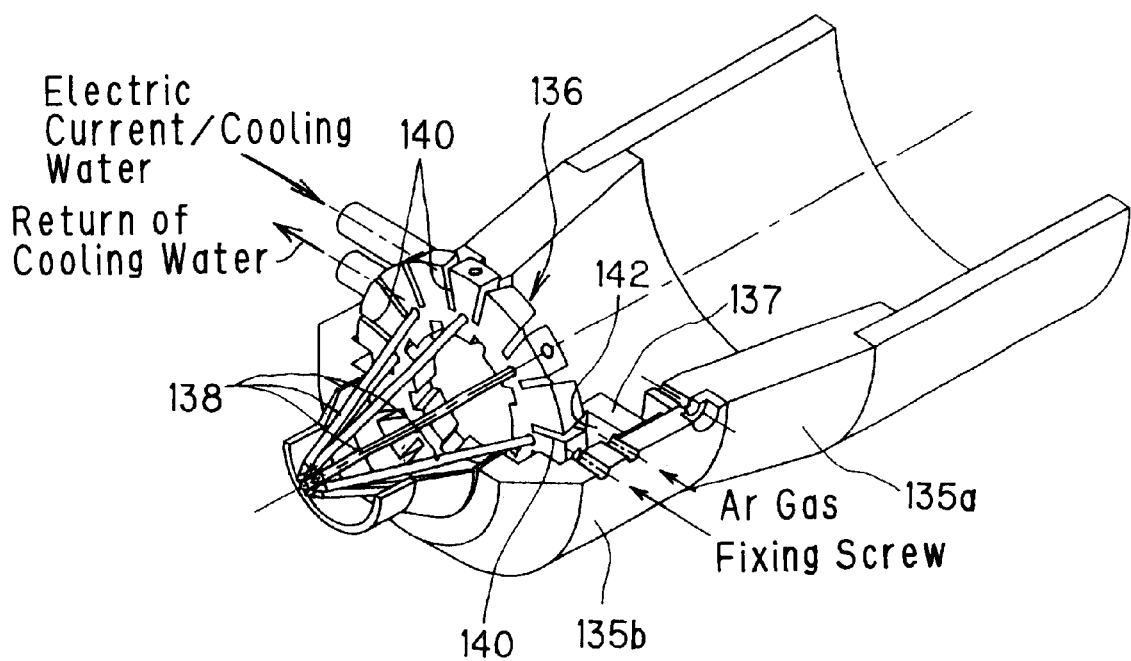
FIG. 26 is a cutaway perspective view of an essential part of an advanced example of the laser/arc combined welding head.
Figure 27:
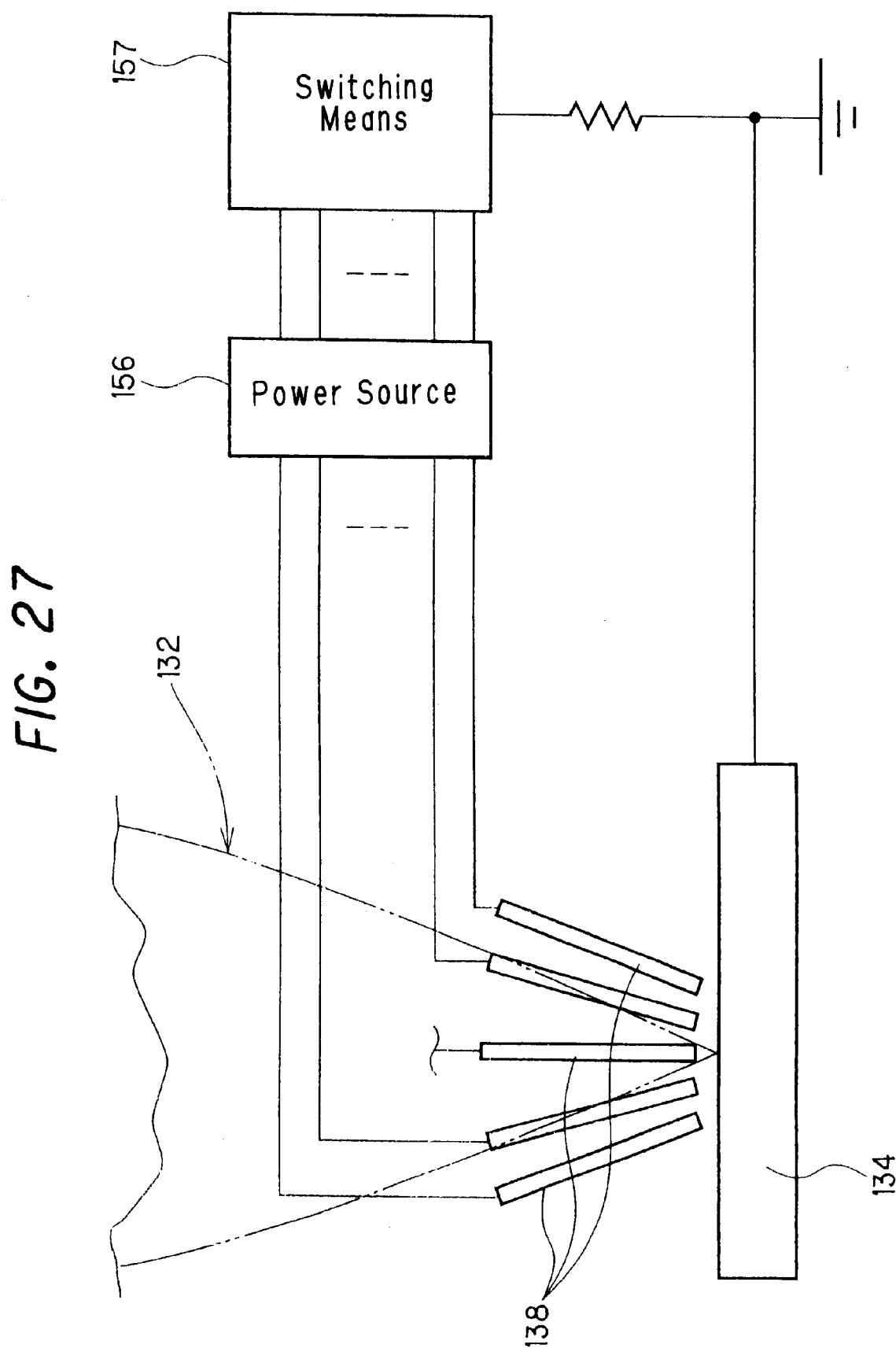
FIG. 27 is a switching circuit diagram of an arc electrode of the advanced example.

FIG. 24 is a sectional view of a laser/arc combined welding head according to a fourth embodiment of the present invention. FIG. 25 is a cutaway perspective view of an essential part of the laser/arc combined welding head. FIG. 26 is a cutaway perspective view of an essential part of an advanced example of the laser/arc combined welding head. FIG. 27 is a switching circuit diagram of an arc electrode of the advanced example.

Constitution

The present embodiment, as shown in FIG. 24, involves applying the gas flow generating means in the preceding Third Embodiment to a laser/arc combined welding head in which an arc electrode placed outside laser light is installed integrally in a welding head using the laser light.

As shown in FIG. 24, a front end portion of an optical fiber 131 is connected to an upper part of the body of a laser/arc combined welding head 19-4. A base end portion of the optical fiber 131 is connected to a YAG laser oscillator (not shown). Laser light 132 oscillated by the YAG laser oscillator is transmitted by the optical fiber 131, and introduced into the welding head 19-4.

The laser light 132 exiting from the front end of the optical fiber 131 is finally focused by a focusing lens array of various lens arrays provided in the welding head 19-4, and applied to a material 134 to be welded, such as a steel plate.

A ring-shaped arc electrode support member 136 is fixed via a hold-down nut 137 to the inner surface of a lower nozzle 135b of vertically divided nozzles 135a and 135b. An arc electrode 138 is located outside the laser light 132 and supported by the arc electrode support member 136.

In the arc electrode support member 136, as shown in FIG. 25, a plurality of (eight in the illustrated embodiment) slant holes 139 for electrode support are formed with equal spacing in the circumferential direction. Slits 140 as gas flow generating means are formed at locations on both sides of the slant hole 139. These slits 140 generate and eject a gas flow 141 along the axis of the arc electrode 138.

That is, an inert gas, such as an argon gas, is introduced from a gas supply source (not shown) into the inside of a jacket 142, which is formed above the arc electrode support member 136 by the hold-down nut 137, via a right angled elbow 144 and a tube 145 communicating with a gas passage 143 formed in the lower nozzle 135b. This introduced inert gas gushes out from the slits 140 as the gas flow 141.

On the upper surface of the arc electrode support member 136 within the jacket 142, an electrically conductive pipe 146 is provided in an annular form through the lower nozzle 135b. A right angled elbow 147 and a tube 148 are connected to the pipe 146. An electric wire (not shown) is connected to the pipe 146, and a voltage is applied from a power source (not shown) to the arc electrode 138 via the pipe 146. Cooling water from the elbow 147 and tube 148 is circulated in the pipe 146 to water-cool the arc electrode 138.

In FIG. 24, the numeral 150 denotes a fixing screw screwed into the lower nozzle 135*b* to fix the arc electrode 138, the numeral 151 denotes a positioning rod for positioning the welding head 19-4 relative to the material 134 to be welded in the direction of height, the numeral 152 denotes an introduction hole for introducing an inert gas for cooling and protecting the lenses of the various lens arrays 133, such as an argon gas, from a gas supply source (not shown) into the welding head 19-4 via a right angled elbow 153 and a tube 154, and the numeral 155 denotes a shield cup.

Actions/Effects

According to the present embodiment, placement adjustment of the arc electrode 138 by the arc electrode adjusting mechanism explained in the First to Third Embodiments is not performed when laser welding and arc welding are carried out simultaneously. However, the gas flow 141 along the axis of the arc electrode 138 is generated and ejected from the slits 140 on both sides of the arc electrode 138 at a predetermined flow velocity (a flow velocity designed by the setting of the slit diameter to be higher than that of the inert gas from the introduction hole 152, but not to affect the weld bead adversely), aside from the inert gas introduced from the introduction hole 152 and ejected from the vertically divisible nozzles 135*a,* 135*b*. Thus, a metal vapor from the material 134 to be welded, which has occurred upon irradiation with the laser light 132, is positively scavenged from around the axis of the arc electrode 138, so that deposition of the metal vapor on the arc electrode 138 is prevented reliably.

Consequently, the arc electrode 138 can be brought as close as possible to the laser light application position of the material 134 to be welded. Thus, an increase in the efficiency of arc welding can be achieved, and the effect of the laser/arc combined welding head 19-4 can be exhibited maximally. According to the present embodiment, moreover, the arc electrode 138 placed outside the laser light 132 is installed integrally within the welding head 19-4 using the laser light 132. Thus, the welding machine can be made much more compact than when the arc electrode 138 and the welding head are provided separately.

Furthermore, according to the present embodiment, the plurality of slant holes 139 and slits 140 are formed in the arc electrode support member 136. By so doing, the plurality of (eight in the illustrated example) arc electrodes 138 can be mounted, where necessary, via insulating means, as shown in FIG. 26. Hence, there can be obtained a structure in which an arc can be issued from the arc electrode 138 close to the direction of ejection of an evaporated gas by the laser light 132 even when the direction of welding is changed during welding. Consequently, a stable weld bead unaffected by the direction of welding can be obtained.

In this case, more stable, higher quality welding can be ensured by imparting a potential difference to the plurality of arc electrodes 138, or providing switching means 156, which can select the arc electrode 138 according to the direction of welding, midway through the circuit from each arc electrode 138 to a power source 157, as shown in FIG. 27.

In each of the above-described embodiments, when the direction of movement of the welding head (the welding direction) is a rightward direction (see the direction of the arrow F in FIGS. 11 and 20), for example, a metal vapor generally flows leftward from the laser application position (upstream in the moving direction of the welding head). To prevent deposition of the metal vapor, therefore, it is generally desirable to move (locate) the arc electrode downstream from the laser light application position in the moving direction of the welding head.

It goes without saying that the welding head 19 in the present invention is not restricted to the above embodiments, but various changes and modifications may be made without departing from the gist of the present invention. For example, the arc electrode adjusting mechanism is not restricted to the laser light division system according to the first to third embodiments, but can be widely applied to a laser/arc combined welding head having laser light and an arc electrode located coaxially. Besides, the gas flow generating means can be widely applied to a laser/arc combined welding head of the laser light division system having no arc electrode adjusting mechanism.

Embodiments on the Reference Position Locating Mechanism

The reference position locating mechanism in the welding system according to the embodiment of the present invention shown in FIG. 1 may, basically, be one having a reference plate 12 (see FIG. 2) adapted to make contact with the end surface of one of materials to be welded, while protruding upward from the upper surface of a table 3 (see FIG. 1), thereby positioning the end surface of this material to be welded, prior to butt welding for butting and welding the end surfaces of the materials to be welded, which are placed on the upper surface of the table 3, and adapted to retreat downward from the upper surface of the table 3 during welding. Hence, the one shown in FIGS. 28(*a*) and 28(*b*) may be conceived.

FIGS. 28(*a*) and 28(*b*) are views showing, in an extracted form, the reference plate 12 and portions close thereto, FIG. 28(*a*) being a perspective view showing the reference plate 12 protruded from the upper surface of the table 3, and FIG. 28(*b*) being a cross sectional view showing the reference plate 12 retreated from the upper surface of the table 3. As shown in both drawings, the reference plate 12 is fitted into a groove 3*a* formed vertically in the table 3, and is adapted to move upward and downward along the groove 3*a*. In the state illustrated in (a), the reference plate 12 is driven by drive means (not shown), such as an air cylinder, to protrude from the upper surface of the table 3. In such a state, the steel plate 1 is contacted with the reference plate 12. After positioning of the steel plate 1 is completed, the reference plate 12 is lowered along the groove 3*a*, and thereby retreated downward from the upper surface of the table 3, as shown in (b).

At this time, at portions of the table 3 along a weld line of the steel plates 1, 2 laid on the table 3, namely, at portions along the moving direction of the welding head 19, a horizontal groove 162 of copper, which is a concave portion extending horizontally on the side opposite to the welding head 19 relative to the steel plates 1, 2, is buried in a concavity of the table 3. The groove 162 is intended to accumulate welding powder 163, such as sludge, fumes or sputter, occurring during butt welding with the welding head 19 moving. The reason why the groove 162 is made of copper is that laser light during laser welding is reflected satisfactorily, and its thermal conductivity is so high that heat during welding can escape satisfactorily.

When the steel plate 1 is butted, the reference plate 12 penetrates through the groove 162 and protrudes upward from the upper surface of the table 3, as shown in FIG. 28(*a*). When retreated, the reference plate 12 descends to a position at which its upper surface is coplanar with the bottom surface of the groove 162, as shown in FIG. 28(*b*).

In this reference position locating mechanism, the groove 162 needs to be formed below the welding head 19, namely, at a position along the weld line, in order to accumulate the welding powder 163. However, since the reference plate 12 faces the groove 162, the welding powder 163 accumulated in the groove 162 is likely to enter the gap between the reference plate 12 and the groove 163*a* as a guide for its ascent and descent. When the welding powder 163 has entered the gap, the positional accuracy of the reference plate 12 when protruding may fail to be fully ensured. For tailored blank welding using the welding head 19 for laser welding, a strict accuracy of about ±100 $\mu$m is required of the weld line.

The following is an embodiment of the reference position locating mechanism capable of establishing the weld line by the reference plate 12 with a high accuracy in response to the above requirement for strict accuracy.

Figure 29:
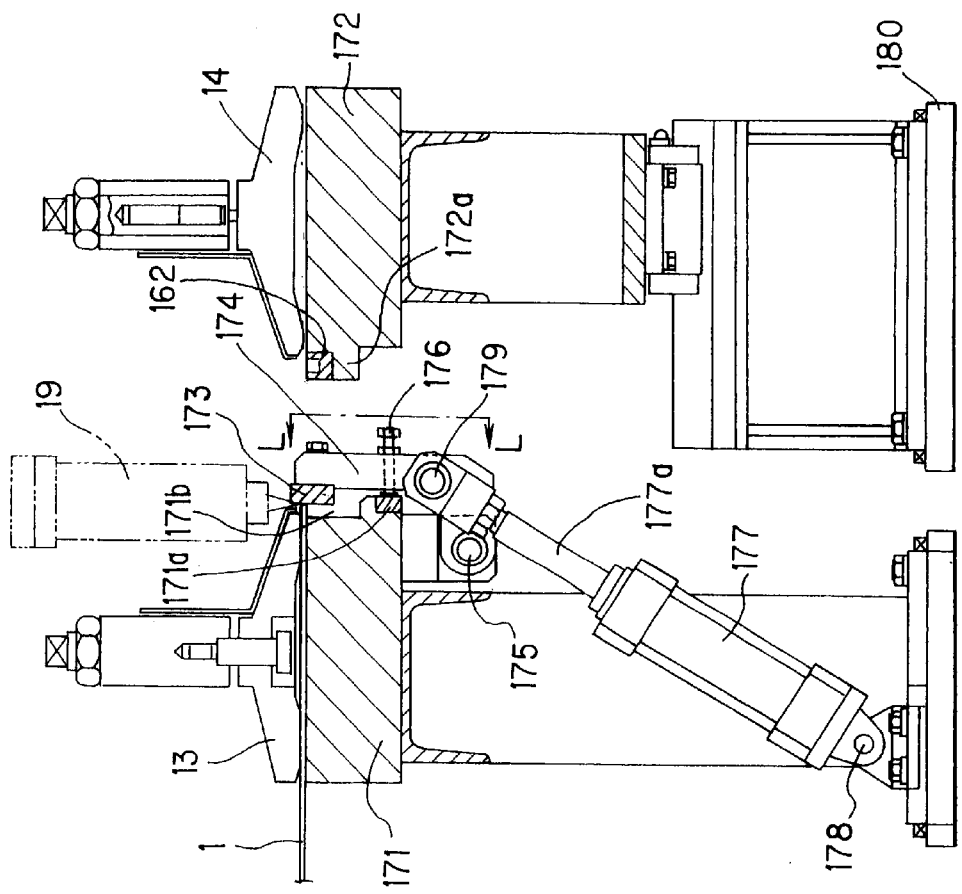
FIG. 29 is a sectional view showing an embodiment related to an improvement of the reference position locating mechanism, with the reference plate ascending.
Figure 30:
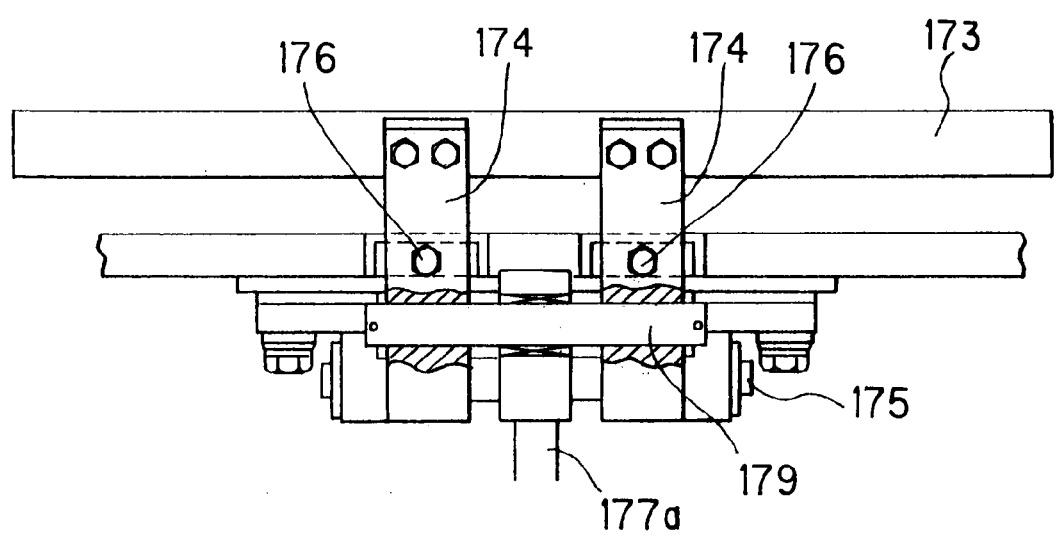
FIG. 30 is a view taken on line L—L of FIG. 29.
Figure 31:
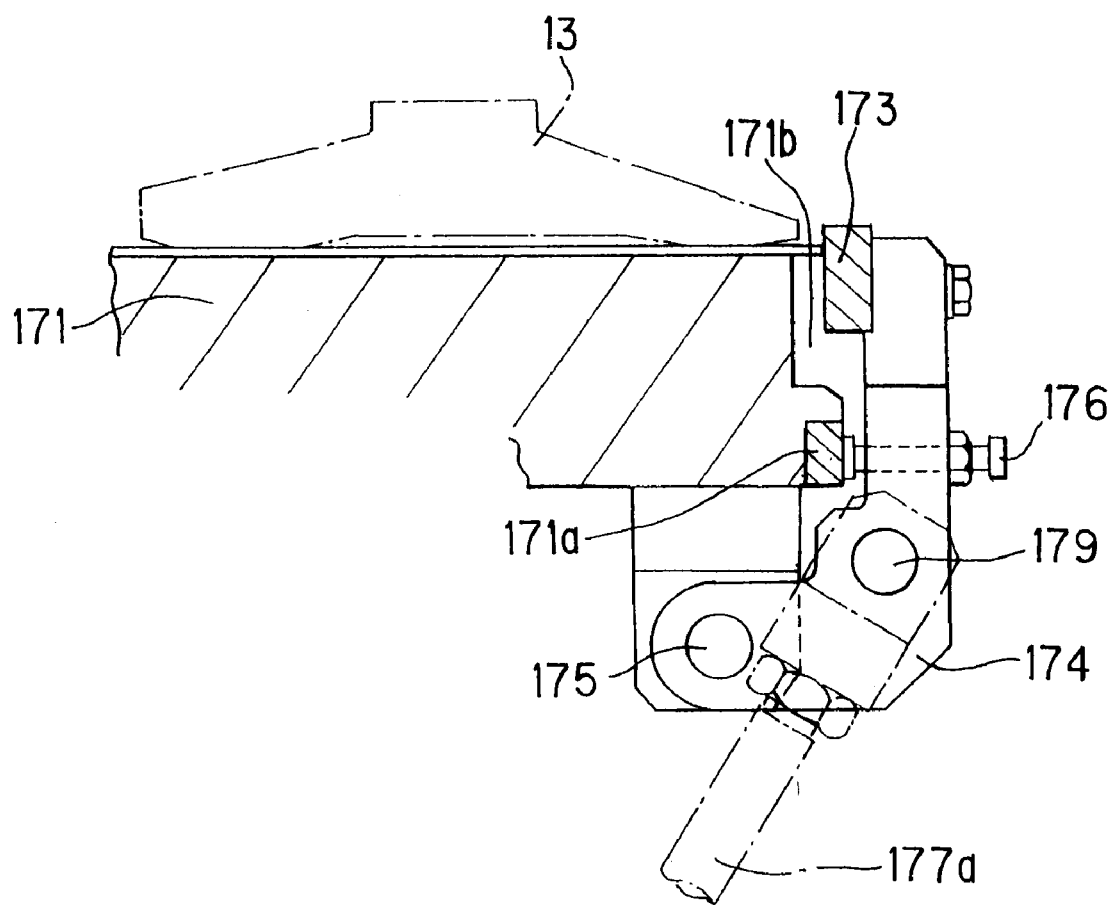
FIG. 31 is an enlarged view showing, in an extracted form, an adjusting mechanism portion for the amount of rotation of a lever in the case shown in FIG. 29.
Figure 32:
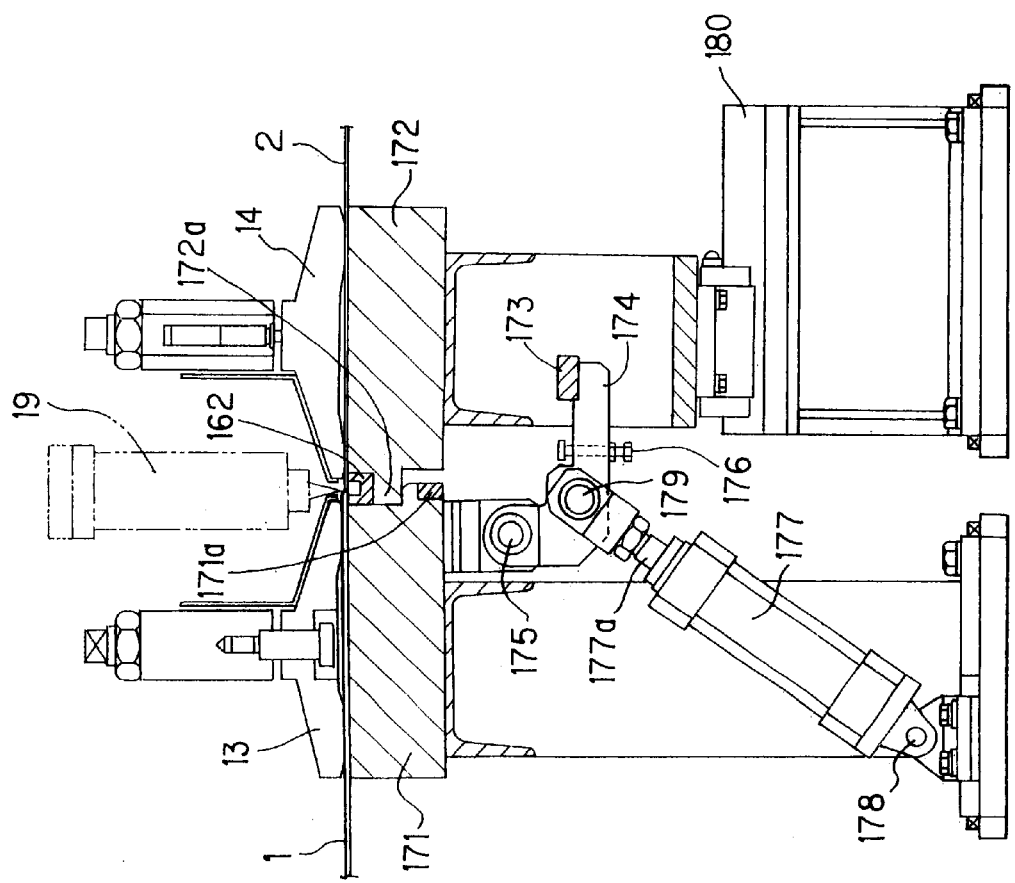
FIG. 32 is a sectional view illustrating the embodiment shown in FIG. 29, with the reference plate descending.

FIG. 29 is a sectional view showing the reference position locating mechanism in butt welding according to an embodiment of the present invention, with the reference plate ascending. FIG. 30 is a view taken on line L—L of FIG. 29. FIG. 31 is an enlarged view showing, in an extracted form, an adjusting mechanism portion for the amount of rotation of a lever in the case shown in FIG. 29. FIG. 32 is a sectional view illustrating the embodiment shown in FIG. 29, with the reference plate descending.

Tables 171 and 172 forming horizontal planes have the same function as that of the table 3 shown in FIG. 28, but they are present as two divisions along the direction of welding. The first table 171, a fixed table, bears a steel plate 1 which is contacted with a reference plate 173 and positioned thereby. The second table 172, a moving table, bears a steel plate 2 whose end surface is contacted with the end surface of the steel plate 1 after being brought into contact with the reference plate 173 and positioned thereby. The second table 172 is horizontally movable on a bench 180.

In the state shown in FIG. 29, i.e., a state in which the end surface of the steel plate 1 is positioned, the second table 172 is separated from the first table 171. In this state, the reference plate 173 protrudes from the upper surface of the first table 171. Here, the reference plate 173 is fastened to a front end portion of an L-shaped lever 174 which rotates about a point below the upper surface of the first table 171 as a center of rotation. That is, the lever 174 has a base end portion pivotably attached to the first table 171, at a point below the upper surface of the first table 171, via a pin 175 provided in the first table 171. An adjusting bolt 176 is screwed to an intermediate site of the lever 174 such that a front end portion of the adjusting bolt 176 protrudes from the end surface of the lever 174. As the lever 174 rotates counterclockwise, the front end of the adjusting bolt 176 contacts a contact portion 171*a* of the end surface of the first table 171, whereby the counterclockwise rotation of the lever 174 is restrained. That is, as shown in FIG. 31 in detail, the position of the reference plate 173 in the horizontal direction (the right-and-left direction in FIG. 29) can be adjusted by adjusting the amount of protrusion of the adjusting bolt 176 from the lever 174. The position of the weld line, the position of the end surface of the steel plate 1, is adjusted to be accurately located directly below the welding head 19 by rotating the adjusting bolt 176 to adjust its amount of protrusion.

An air cylinder 177 has a base end portion pivotably attached to a lower portion of the first bed 171 via a pin 178, and a front end portion of its piston rod 177*a* is pivotably connected to a central portion of the lever 174 via a pin 179. The state of the piston rod 177*a* extended maximally by driving of the air cylinder 177 is the state shown in FIG. 29, while the state of the piston rod 177*a* contracted maximally by driving of the air cylinder 177 is the state shown in FIG. 32. That is, when the air cylinder 177 is driven to have its piston rod 177*a* contracted, with the reference plate 173 protruding from the upper surface of the first table 171, as shown in FIG. 29, the lever 174 rotates clockwise in the drawing about the pin 175 as a center of rotation. As a result, the reference plate 173 comes into a state retreated downwardly of the upper surface of the first table 171, as shown in FIG. 32.

At the site of contact between the first table 171 and the second table 172, a protrusion 172*a*, and a step 171*b* into which the protrusion 172*a* is fitted are formed. The protrusion 172*a* is formed at the end of the second table 172 so as to protrude horizontally toward the end surface of the first table 171, and the step 171*b* is formed on the end surface of the first bed 171 so as to be opposed to the protrusion 172*a*. The groove 162 extending along the weld line, the locus of the welding head 19 during its movement, is buried in the protrusion 172*a*.

In the above-mentioned embodiment, when positioning of the end surface of one steel plate 1 is to be performed, the reference plate 173 is protruded upward from the upper surface of the first table 171, with the second table 172 being separated from the first table 171, as shown in FIG. 29. This is performed by driving the air cylinder 177 in the state illustrated in FIG. 32 to extend its piston rod 177*a*. That is, upon extension of the piston rod 177*a*, the lever 174 rotates counterclockwise about the pin 175 as a center of rotation. This rotation of the lever 174 stops, because it is restrained when the front end surface of the adjusting bolt 176 contacts the contact portion 171*a* of the first bed 171. That is, the lever 174 is positioned at this position.

In this state, the end surface of the steel plate 1 is brought into contact with the reference plate 173 from left in the drawing to carry out the positioning of the steel plate 1. Then, a hold-down fitting 13 is lowered to clamp the end portion of the steel plate 1 from above.

In this state, the air cylinder 177 is driven to contract its piston rod 177*a*. Upon contraction of the piston rod 177*a*, the lever 174 rotates clockwise about the pin 175 as the center of rotation to retreat the reference plate 173 downward from the upper surface of the first table 171.

Then, the second bed 172 is moved toward the first bed 171 to bring its end surface into contact with the end surface of the first bed 171. At this time, the protrusion 172*a* fits into the step 171*b*, closing the space above the reference plate 173. Then, the steel plate 2 is moved toward the butt end surface of the steel plate 1 to butt the end surfaces of the steel plates 1 and 2 against each other. In this state, a hold-down fitting 14 is lowered to clamp the end portion of the steel plate 2 from above.

In this state, the welding head 19 is run to butt weld the butt portions of the steel plates 1 and 2.

The above embodiment involves, but is not limited to, the structure in which the air cylinder 177 is used as drive means to rotate the lever 174, thereby raising or lowering the reference plate 173. A motor or the like may be considered as the drive means, and the structure in which the lever is rotated to raise or lower the reference plate 173 is not necessarily restrictive. The reference plate 173 may be adapted to ascend and descend in a straight manner. This is because the table is divided into two parts, the first bed 171 and the second bed 172, and during retreat of the reference plate 173, the space above it is closed because of the contact between the first bed 171 and the second bed 172. That is, the welding powder 163 during welding (see FIG. 28) does not enter the space where the reference plate 173 is retreated.

Embodiments on the Transport Device

The transport device in the welding system according to the embodiment of the present invention shown in FIG. 1 may basically be one for transporting the material to be welded, which has been laid on the upper surface of the table 3 (see FIG. 1), toward the reference plate 12 (see FIG. 1) or the end surface of one material to be welded, whose positioning has been completed upon contact with the reference plate 12. Therefore, the transport device shown in FIG. 2, for example, is conceivable.

However, when such a transport device is used, the positioning operation for the steel plates 1, 2 by the aforementioned moving claws 8, 9 is effective for the steel plates 1, 2 being in the form of a rectangle or a square. On the other hand, the positioning operation is not applicable when the steel plate 2 is, for example, shaped like a trapezoid as shown by a two-dot chain line in FIG. 2. That is, there is no provision for the steel plate being an odd-shaped steel plate of a shape other than a rectangle or square. However, there are uses for which odd-shaped steel plates are butt welded. There should be provisions for such uses.

An explanation will be offered for an embodiment related to the transport device which can transport the material to be welded, even if it is an odd-shaped steel plate, satisfactorily to a predetermined position.

Figure 33:
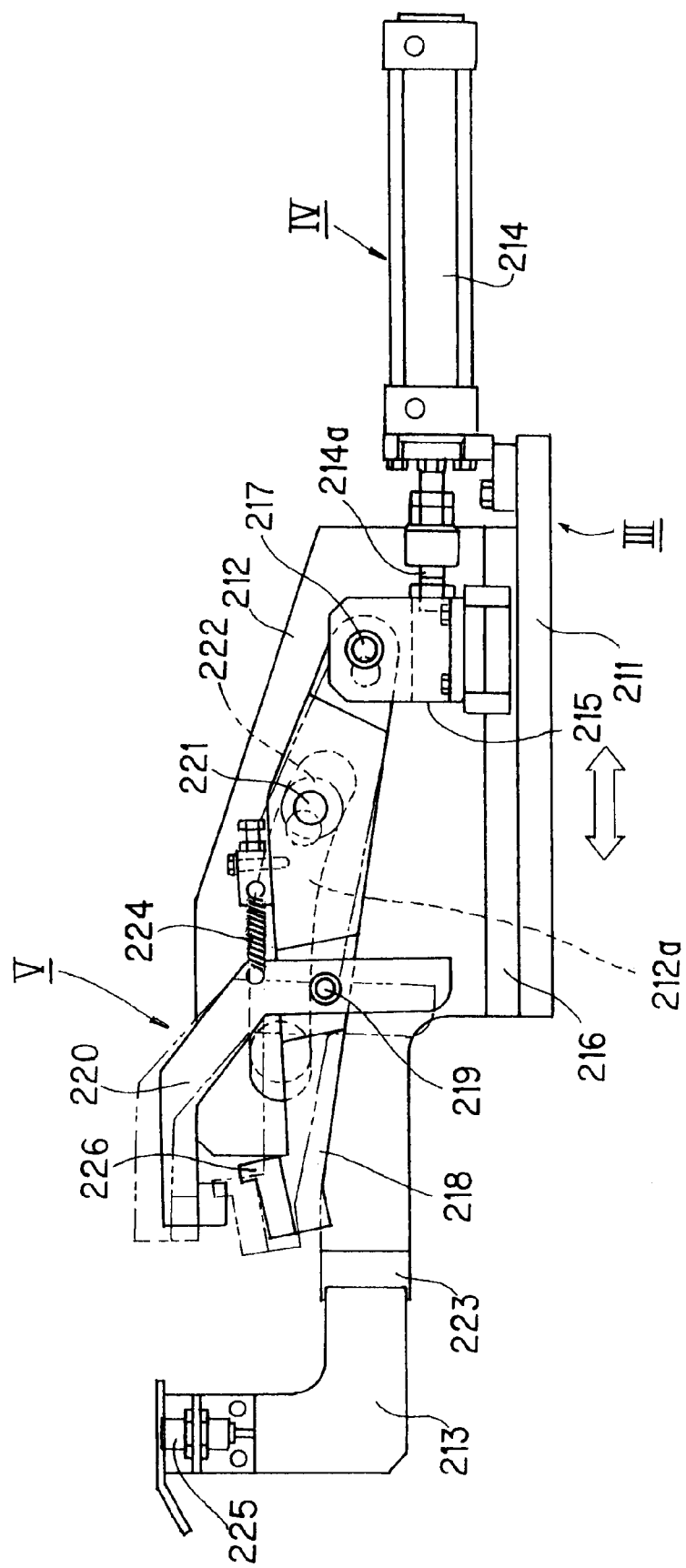
FIG. 33 is a view showing, in an extracted form, a main portion of a transport arm according to an embodiment related to a transport device, as a side view showing its normal (non-operating) state.
Figure 34:
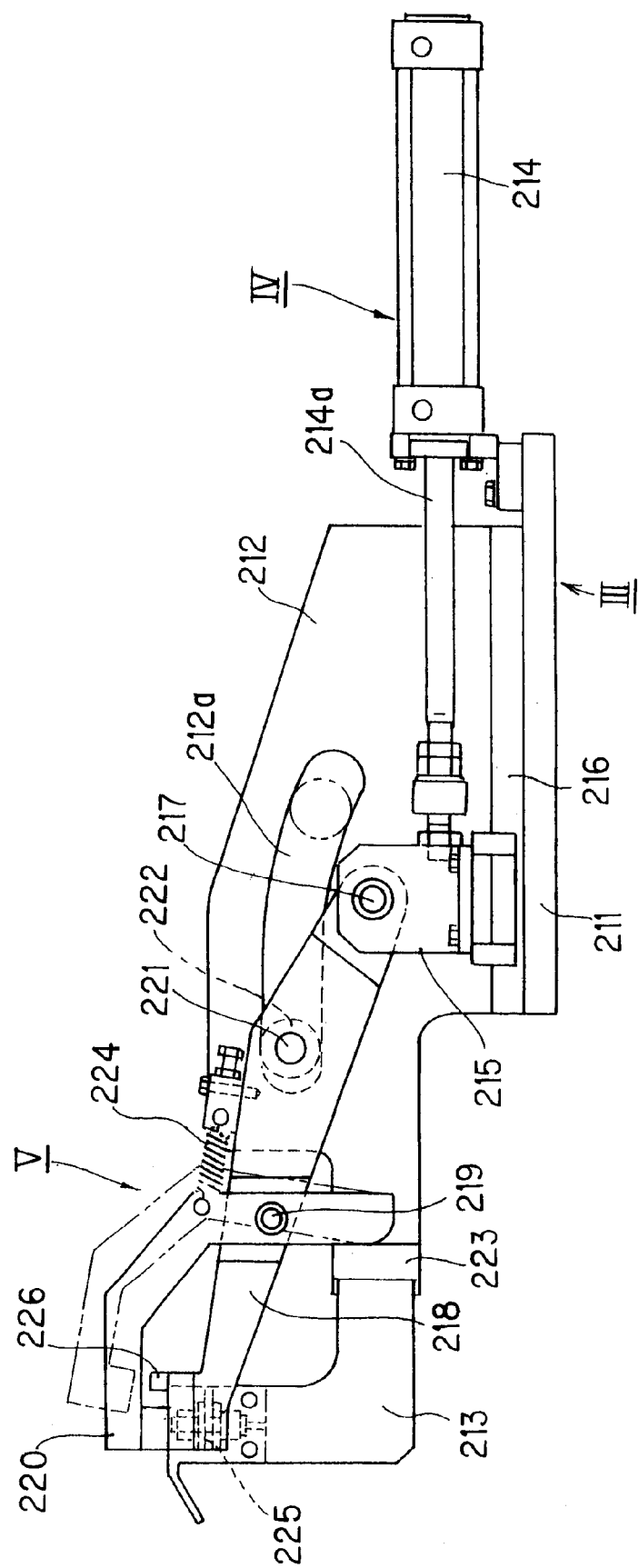
FIG. 34 is a view showing, in an extracted form, the main portion of the transport arm according to the embodiment, as a side view showing its operating state.

FIGS. 33 and 34 are side views showing a main portion of a transport arm in the transport device according to the present embodiment, FIG. 33 illustrating a normal (non-operating) state, and FIG. 34 illustrating an operating state. As shown in both drawings, the transport arm according to the present embodiment comprises a bench III, drive means IV, and a grip V, and is constituted such that the drive means IV and the grip V linearly move integrally with the bench III, and at a time when a predetermined approach to an odd-shaped steel plate (not shown in FIG. 33 or 34) to be grasped by the grip V is sensed, the grip V grasps an end portion of the odd-shaped steel plate while the drive means IV is moving the grip V forward (in a direction of access to the odd-shaped steel plate).

The bench III has a horizontal base plate 211, a vertical member 212 provided vertically on the base plate 211, and an L-shaped support member 213 protruding forward from the front end of the vertical member 212 and supporting the odd-shaped steel plate from below by its front end portion. The bench III is also fastened to the front end of an air cylinder 214 as the drive means IV. The air cylinder 214 has its piston rod 214a extended and contracted in a horizontal direction to move a moving member 215, which is fastened to the front end of the piston rod 214a, linearly in the horizontal direction along a guide member 216 fastened to the base plate 211.

The grip V has a lower lever 218 whose base end portion is pivotably attached to the moving member 215 by a pin 217, and an upper lever 220 pivotably attached to the center of the lower lever 218 by a pin 219. The lower lever 218 and the upper lever 220 integrally move in accordance with the linear movement of the moving member 215 associated with the driving of the air cylinder 214. A pin 221 is provided at a site intermediate between the pins 217 and 219 of the lower lever 218, and a roller 222 attached to the pin 221 is fitted into an elongated hole 212a provided in a longitudinal direction of the vertical member 212. The elongated hole 212a is a hole extending generally in a horizontal direction, and is adapted to have its position in the vertical member slightly higher toward its front end.

In the normal state shown in FIG. 33, the pin 221 and the roller 222 are located at the rearmost site of the elongated hole 212a (the right end in the drawing), and the highest portion of the upper lever 220 is situated at a lower position than the highest portion of the support member 213. The pin 221 and the roller 222 move along the elongated hole 212a in accordance with the movement of the moving member 215 associated with the driving of the air cylinder 214. As a result, the lower lever 218 slightly rotates clockwise in the drawing about the pin 217 as a center of rotation, raising the position of its front end portion. At a final position after such a movement, the upper end surface position of the front end portion of the lower lever 218 agrees with the upper end surface position of the front end portion of the support member 213. That is, the odd-shaped steel plate is supported from below at this height position.

The upper lever 220 is an L-shaped member whose base end portion suspends downward from the site of the pin 219. As the lower lever 218 moves forward, a lower end portion of the base end portion contacts a contact member 223 protruding horizontally from the support member 213. As a result, the lower lever 218 further moves forward in this contact state, whereby the upper lever 220 rotates counter-clockwise in the drawing about the pin 221 as a center of rotation. Thus, the lower surface of the front end portion of the upper lever 220 and the upper surface of the front end portion of the lower lever 218 approach and contact each other. Consequently, if an odd-shaped steel plate exists between the front end portion of the upper lever 220 and the front end portion of the lower lever 218, the odd-shaped steel plate can be grasped by the front end portions of both levers 218 and 220. A force for grasping the odd-shaped steel plate can be adjusted by a spring 224. That is, one end of the spring 224 is fixed to the lower lever 218, and the other end of it is fixed to the upper lever 220, so that a rotational force for rotating the upper lever 220 clockwise in the drawing about the pin 219 as a center of rotation is constantly imparted to the upper lever 220.

A steel plate detection sensor 225 is disposed at a front end portion of the support member 213, and serves to deliver a detection signal when the distance to the odd-shaped steel plate is not more than a predetermined value. For example, the detection sensor 225 can be formed preferably from a proximity sensor. A grasp state detection sensor 226 is disposed on the upper end surface of the front end portion of the lower lever 218, and serves to deliver a detection signal when it enters into a grasp state in cooperation with the front end portion of the upper lever 220. The detection sensor 226 can also be formed preferably from a proximity sensor, for example.

The above-described transport arm is moved so as to approach, as a whole, an object to be subjected to a grasping operation, such as an odd-shaped steel plate. During such an approaching action, the whole of the transport arm is moved leftward in the drawing. At a time when the front end portion during this movement, i.e., the steel plate detection sensor 225 disposed in the support member 213, is located below the odd-shaped steel plate, the presence of this odd-shaped steel plate is detected by the steel plate detection sensor 225. Movement of the entire transport arm is stopped at this point in time.

When the steel plate detection sensor 225 has detected the odd-shaped steel plate, the relative positions of the bench III and the drive means IV relative to the odd-shaped steel plate are fixed. In this state, the air cylinder 214, the drive means IV, is driven to move the moving member 215 forward (leftward in the drawing; the same is true in the descriptions to follow), thereby moving the lower lever 218 and the upper lever 220 in the same direction. By the action of the pin 221 and roller 222 moving along the elongated hole 212a in accordance with the above movement, the lower lever 218 is raised in position while rotating counterclockwise about the pin 217 as a center of rotation. The upper lever 220 has its lower portion contacting the contact member 223, and further moves forward in this state, thereby rotating counterclockwise about the pin 219 as a center of rotation. At this final stage of movement, the upper end surface of the front end portion of the lower lever 218 becomes coplanar with the upper end surface of the front end portion of the support member 213, supporting the odd-shaped steel plate from below. Also, the odd-shaped steel plate can be grasped between the upper lever 220 and the lower lever 218. Proper grasp of the odd-shaped steel plate is detected by the grasp state detection sensor 226.

Figure 35:
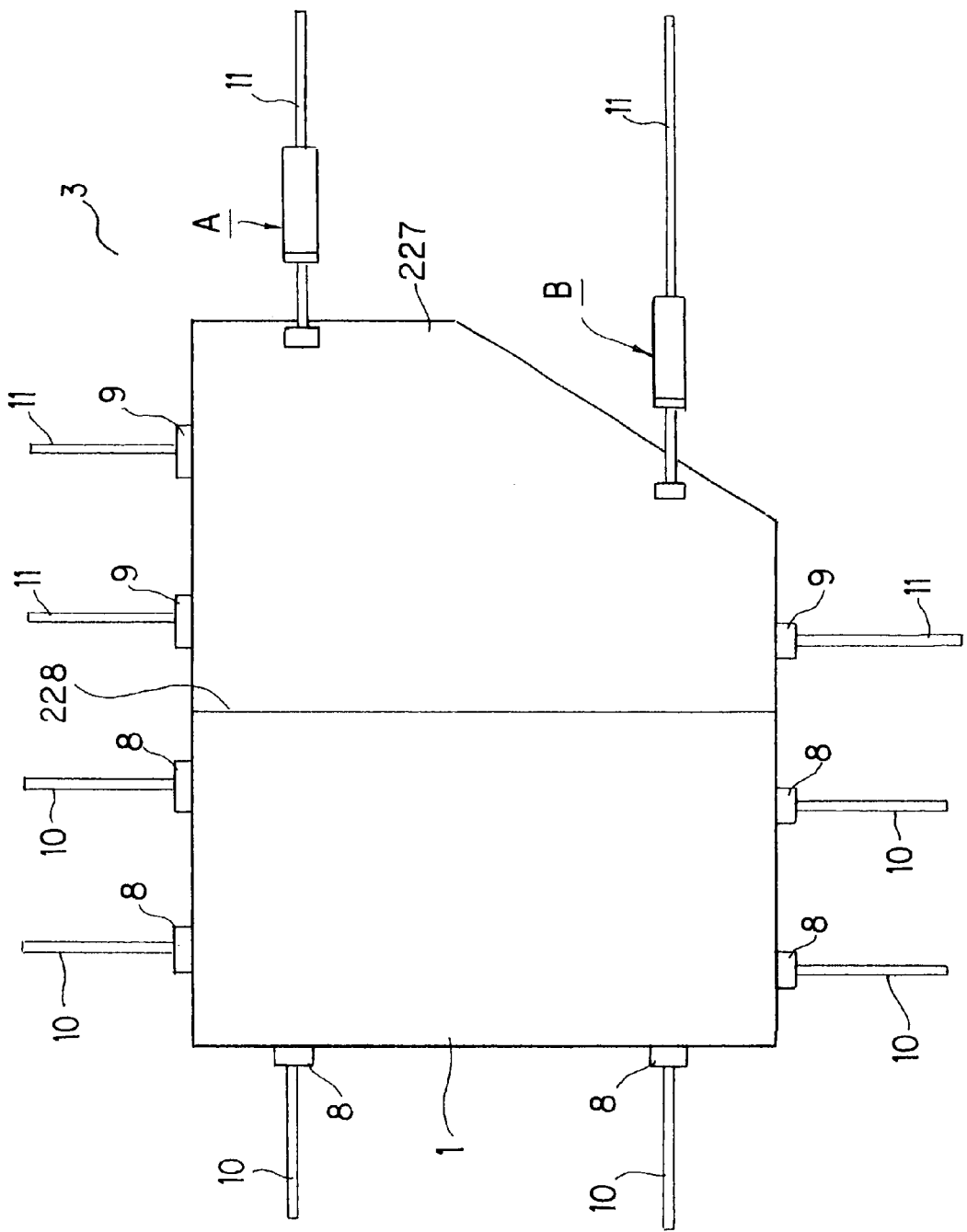
FIG. 35 is an explanation drawing conceptually showing a mode of butting of odd-shaped steel plates using a transport system according to the present embodiment.
Figure 36:
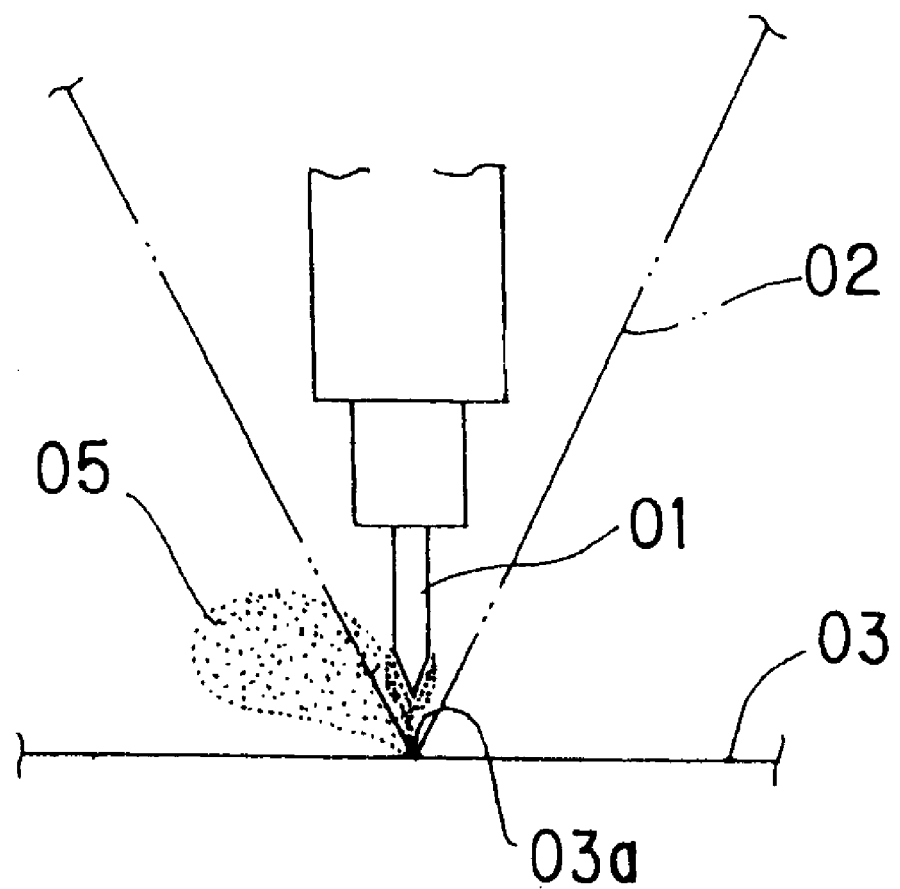
FIG. 36 is an explanation drawing of conventional laser/arc combined welding.

FIG. 35 is an explanation drawing conceptually showing a mode of butting using the transport device having the transport arm according to the above-described embodiment. The drawing shows butting of an odd-shaped steel plate 227 against a steel plate 1, and the same parts as in FIG. 2 are assigned the same numerals. The present embodiment is an embodiment in which the steel plate 1 is positioned by the same operation as shown in FIG. 2, and then the odd-shaped steel plate 227 is butted against the steel plate 1. The present embodiment has two (this number is not restrictive) of the transport arms shown in FIGS. 33 and 34. A and B in the drawing denote the transport arms. In FIG. 35, the same parts as in FIG. 2 are assigned the same numerals. Thus, duplicate explanations are omitted.

In the above-mentioned system, the transport arms A and B are moved along grooves 11 to grasp an end portion of an odd-shaped steel plate 27 individually. That is, the transport arm A is located earlier below the odd-shaped steel plate 227. Thus, the transport arm A carries out a grasping operation at this position, and waits in this state. The transport arm B further advances, and performs a grasping action while being located below the odd-shaped steel plate 227. Thus, the odd-shaped steel plate 227 has two sites of its end portion grasped by the transport arms A and B. In this state, the transport arms A and B are synchronized, and moved parallel in the same amount toward the butt surface of the steel plate 1. Eventually, the butt end surface of the odd-shaped steel plate 227 is contacted with the butt end surface of the steel plate 1. The grasping force at this time is adjusted by the spring 224, so that some misalignment of the odd-shaped steel plate 227 with the end surface of the steel plate 1 can be accommodated by a slide between the lower lever 218 and upper lever 220 and the odd-shaped steel plate 227. In this manner, butting against the steel plate 1 is performed as shown in FIG. 35. A weld line at this time is indicated by the numeral 228 in the drawing.

INDUSTRIAL APPLICABILTY

As discussed above, the welding system according to the present invention is useful as a system for performing butt welding, such as tailored blank welding.

What is claimed is:

1. A welding system comprising:
a welding stage having a table forming a horizontal surface on which materials to be welded are placed;
reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;
transport means for the materials to be welded, adapted to transport the material to be welded, which has been placed on the upper surface of the table, toward the reference plate, or the end surface of the one of the materials to be welded whose positioning has been completed upon contact with the reference plate;
a horizontal beam supported at both ends by vertical end struts, and disposed horizontally like a bridge over the welding stage;
a carriage traveling horizontally on the horizontal beam; and
a welding head loaded on the carriage, and moved along a weld line together with the carriage to weld a weld area of the materials to be welded which have been placed on the welding stage, and wherein
the welding head is a laser/arc combined welding head for simultaneously performing laser light irradiation and arc discharge of the materials to be welded, thereby welding the materials to be welded, and
further includes arc electrode position adjusting means for moving an arc electrode in a direction perpendicular to a direction of an optical axis of laser light applied to the materials to be welded, thereby adjusting a position of the arc electrode in the perpendicular direction relative to a position of irradiation with laser light in the materials to be welded.

2. A welding system comprising:
a welding stage having a table forming a horizontal surface on which materials to be welded are placed;
reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;
transport means for the materials to be welded, adapted to transport the material to be welded, which has been placed on the upper surface of the table, toward the reference plate, or the end surface of the one of the materials to be welded whose positioning has been completed upon contact with the reference plate;
a horizontal beam supported at both ends by vertical end struts, and disposed horizontally like a bridge over the welding stage;
a carriage traveling horizontally on the horizontal beam; and
a welding head loaded on the carriage, and moved along a weld line together with the carriage to weld a weld area of the materials to be welded which have been placed on the welding stage, and wherein
the welding head is a laser/arc combined welding head for simultaneously performing laser light irradiation and arc discharge of the materials to be welded, thereby welding the materials to be welded, and further includes arc electrode inclination angle adjusting means for inclining an arc electrode relative to an optical axis of laser light, thereby adjusting an inclination angle of the arc electrode.

3. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the welding head is a laser/arc combined welding head for simultaneously performing laser light irradiation and arc discharge of the materials to be welded, thereby welding the materials to be welded, and further includes arc electrode distance adjusting means for bringing an arc electrode close to or away from a laser light irradiation position in the materials to be welded, thereby adjusting a distance between the laser light irradiation position and the arc electrode.

4. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the welding head is a laser/arc combined welding head for simultaneously performing laser light irradiation and arc discharge of the materials to be welded, thereby welding the materials to be welded, and further includes an arc electrode adjusting mechanism composed of arc electrode position adjusting means for moving an arc electrode in a direction perpendicular to a direction of an optical axis of laser light applied to the materials to be welded, thereby adjusting a position of the arc electrode in the perpendicular direction relative to a laser light irradiation position in the materials to be welded, arc electrode inclination angle adjusting means for inclining the arc electrode relative to the optical axis of laser light, thereby adjusting an inclination angle of the arc electrode, and arc electrode distance adjusting means for bringing the arc electrode close to or away from the laser light irradiation position in the materials to be welded, thereby adjusting a distance between the laser light irradiation position and the arc electrode.

5. The welding head of claim 4, characterized in that the arc electrode adjusting mechanism comprises a pair of flange mounting surfaces formed parallel on both sides of a nozzle of the welding head, and having elongated holes elongated in the direction of the optical axis of laser light to be applied to the materials to be welded, opposite ends of an arc electrode support member being inserted through the elongated holes, first flanges each having elongated holes elongated in the direction of the optical axis, being fixed to the flange mounting surface by screws via the elongated holes, and having a hole of such a size that the arc electrode support member is tiltable, the opposite ends of the arc electrode support member being inserted through the holes, first seal members each interposed between the flange mounting surface and the first flange, and surrounding a periphery of the elongated hole of the flange mounting surface, second flanges each fixed to an outer surface of the first flange by screws, having a hole larger than the hole of the first flange for insertion of the opposite ends of the arc electrode support member, and having a protrusion in a portion outside the hole, the protrusion protruding inward over an entire periphery, having an inner periphery larger than an outer periphery of the arc electrode support member, and allowing the arc electrode support member to tilt, and second seal members each disposed along an inner peripheral surface of the hole of the second flange to surround the outer periphery of the arc electrode support member, and squeezed by the protrusion of the second flange when the screws are tightened to fix the second flange to the first flange, thereby closing a gap between the arc electrode support member and the second flange, and fixing the arc electrode support member by a reaction force.

6. The laser/arc combined welding head of claim 4, characterized in that the arc electrode adjusting mechanism comprises a support member for pivotably supporting an arc electrode support member, a first vertical slide guide fixed to a side portion of a nozzle of the welding head, a second vertical slide guide guided by the first vertical slide guide in the direction of the optical axis of laser light applied to the materials to be welded, a cross feed screw screwed to the first vertical slide guide, and having a front end portion rotatably Joined to the support member to move the arc electrode in the direction perpendicular to the direction of the optical axis together with the support member and the arc electrode support member, a swing feed screw screwed to the first vertical slide guide, and having a front end portion rotatably and pivotably joined to the arc electrode support member to pivot the arc electrode together with the arc electrode support member, and a vertical feed screw screwed to the first vertical slide guide, and having a front end in contact with a bottom surface of the second vertical slide guide to move the arc electrode in the direction of the optical axis together with the second vertical slide guide, the support member, and the arc electrode support member.

7. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the welding head is a laser/arc combined welding head for simultaneously performing laser light irradiation and arc discharge of the materials to be welded, thereby welding the materials to be welded, and further includes gas flow generating means provided in a support portion of an arc electrode for generating and ejecting a gas flow along an axis of the arc electrode.

8. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the welding head is a laser/arc combined welding head for simultaneously performing laser light irradiation and arc discharge of the materials to be welded, while disposing an arc electrode outside laser light, thereby welding the materials to be welded, and further includes gas flow generating means provided in a support portion of the arc electrode for generating and ejecting a gas flow along an axis of the arc electrode, with the arc electrode being disposed outside the laser light in the same welding head.

9. The welding system of claim 8, characterized in that a plurality of the arc electrodes are attached to a ring-shaped support member, which surrounds the laser light, with predetermined spacing in a circumferential direction, and can be used selectively according to a direction of welding.

10. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the reference position locating means is constituted such that a second table is divided so as to be contactable with or separable from a first table, the first table bearing one of the materials to be welded, and the second table bearing the other material to be welded which is butt welded to the one material to be welded, in positioning the end surface of the one material to be welded, the reference plate is protruded upward from the upper surface of the first table, with the second table being separated from the first table, and after completion of a positioning operation for the end surface of the one material to be welded, the reference plate is retreated downward from the upper surface of the first table, and the second table is moved toward the first table, whereupon its end surface contacts the end surface of the first table, thereby closing a space above the retreated reference plate, and the welding head is a laser/arc combined welding head for simultaneously performing laser light irradiation and arc discharge of the materials to be welded, thereby welding the materials to be welded, and further includes arc electrode position adjusting means for moving an arc electrode in a direction perpendicular to a direction of an optical axis of laser light applied to the materials to be welded, thereby adjusting a position of the arc electrode in the perpendicular direction relative to a position of irradiation with laser light in the materials to be welded.

11. A welding system comprising:

a welding stage having a table forming a horizontal surface on which materials to be welded are placed;

reference position locating means having a reference plate which is contacted by an end surface of one of the materials to be welded, while protruding upward from an upper surface of the table, to position the end surface of the material to be welded, prior to butt welding for butting the end surfaces of the materials placed on the upper surface of the table and welding the end surfaces together, and which retreats downward from the upper surface of the table during welding;

transport means for the materials to be welded, adapted to transport the material to be welded, which has been placed on the upper surface of the table, toward the reference plate, or the end surface of the one of the materials to be welded whose positioning has been completed upon contact with the reference plate;

a horizontal beam supported at both ends by vertical end struts, and disposed horizontally like a bridge over the welding stage;

a carriage traveling horizontally on the horizontal beam; and a welding head loaded on the carriage, and moved along a weld line together with the carriage to weld a weld area of the materials to be welded which have been placed on the welding stage, and wherein the transport means has a plurality of transport arms, and is configured such that the plurality of transport arms are moved parallel toward a material to be welded, which is an odd-shaped member;

each time a welded material detection sensor of each transport arm detects the material to be welded, drive means of the transport arm is driven to grasp an end portion of the material, to be welded, between an upper lever and a lower lever of the transport arm and detect a state of grasp by a grasp state detection sensor; and after a state of grasp by all the transport arms of the material to be welded is detected, each transport arm is moved parallel in the same amount to transport the material to be welded up to a predetermined position, the transport arm includes a bench having the welded material detection sensor at a front end thereof, and adapted to move toward the odd-shaped material to be welded, the drive means disposed on the bench, the lower lever caused to protrude forward from the bench by driving of the drive means, and rotating in one direction relative to the bench to contact the odd-shaped material, to be welded, from below the material to be welded, and the upper lever caused to protrude forward from the bench, integrally with the lower lever, upon driving of the drive means, and rotating in the opposite direction relative to the bench to contact the material, to be welded, from above the material to be welded, and after the welded material detection sensor detects the material to be welded, the upper lever and the lower lever are rotated, whereby the end portion of the material to be welded is grasped between the upper lever and the lower lever, and the welding head is a laser/arc combined welding head for simultaneously performing laser light irradiation and arc discharge of the materials to be welded, thereby welding the materials to be welded, and further includes arc electrode position adjusting means for moving an arc electrode in a direction perpendicular to a direction of an optical axis of laser light to be applied to the materials to be welded, thereby adjusting a position of the arc electrode in the perpendicular direction relative to a position of irradiation with laser light in the materials to be welded.

12. A welding system comprising:

a plurality of welding stages each having a table forming a horizontal surface on which materials to be welded are placed, and being disposed adjacent to each other;

a horizontal beam supported at both ends by vertical end struts, and disposed horizontally like a bridge over the welding stages;

an intermediate strut supporting an intermediate site of the horizontal beam between the adjacent welding stages;

a carriage traveling horizontally on the horizontal beam;

a plurality of reference position locating means each having a reference plate which is contacted by an end surface of one of the materials to be welded, while protruding upward from an upper surface of each table, to position the end surface of the material to be welded, prior to butt welding for butting the end surfaces of the materials placed on the upper surface of each table and welding the end surfaces together, and which retreats downward from the upper surface of each table during welding;

a plurality of transport means for materials to be welded, adapted to transport the material to be welded, which has been placed on the upper surface of each table, toward the reference plate, or the end surface of the one of the materials to be welded whose positioning has been completed upon contact with the reference plate;

a welding head loaded on the carriage, and moved along a weld line together with the carriage to weld a weld area of the materials to be welded which have been placed on the welding stages, and wherein the welding head is a laser/arc combined welding head for simultaneously performing laser light irradiation and arc discharge of the materials to be welded, thereby welding the materials to be welded, further includes arc electrode position adjusting means for moving an arc electrode in a direction perpendicular to a direction of an optical axis of laser light applied to the materials to be welded, thereby adjusting a position of the arc electrode in the perpendicular direction relative to a position of irradiation with laser light in the materials to be welded, and is configured such that in accordance with movement in one direction of the carriage located at one of ends of the horizontal beam as an initial position, the welding head welds the material, to be welded, on each welding stage at a predetermined welding speed, and upon completion of welding of the materials, to be welded, on all the stages as a result of movement to the other end of the horizontal beam, the welding head moves in the opposite direction at a higher speed than the welding speed, arrives at the initial position, and performs a predetermined welding operation while moving again toward the other end along the horizontal beam.

* * * * *